US008266676B2

(12) United States Patent
Hardjono et al.

(10) Patent No.: US 8,266,676 B2
(45) Date of Patent: Sep. 11, 2012

(54) METHOD TO VERIFY THE INTEGRITY OF COMPONENTS ON A TRUSTED PLATFORM USING INTEGRITY DATABASE SERVICES

(75) Inventors: Thomas Parasu Hardjono, Portland, OR (US); David Maurits Bleckmann, Portland, OR (US); William Wyatt Starnes, Portland, OR (US); Bradley Douglas Andersen, Tigard, OR (US)

(73) Assignee: Harris Corporation, Melbourne, FL (US)

( * ) Notice: Subject to any disclaimer, the term of this patent is extended or adjusted under 35 U.S.C. 154(b) by 897 days.

(21) Appl. No.: 11/608,742

(22) Filed: Dec. 8, 2006

(65) Prior Publication Data

US 2007/0143629 A1    Jun. 21, 2007

Related U.S. Application Data

(63) Continuation-in-part of application No. 11/288,820, filed on Nov. 28, 2005, now Pat. No. 7,272,719.

(60) Provisional application No. 60/749,368, filed on Dec. 9, 2005, provisional application No. 60/759,742, filed on Jan. 17, 2006, provisional application No. 60/637,066, filed on Dec. 17, 2004, provisional application No. 60/631,450, filed on Nov. 29, 2004, provisional application No. 60/631,449, filed on Nov. 29, 2004.

(51) Int. Cl.
*H04L 29/06* (2006.01)

(52) U.S. Cl. ........... 726/3; 726/2; 726/4; 726/5; 726/27; 726/30; 709/229; 709/238; 713/155; 713/159; 713/161; 713/181

(58) Field of Classification Search ........................ None
See application file for complete search history.

(56) References Cited

U.S. PATENT DOCUMENTS 5,465,299 A    11/1995    Matsumoto et al.
(Continued)

FOREIGN PATENT DOCUMENTS
WO    2006058313    1/2006
(Continued)

OTHER PUBLICATIONS

Liu et al., "A Dynamic Trust Model for Mobile Ad Hoc Networks", May 26, 2004, IEEE, Proceedings of the 10th IEEE Internation Workshop on Future Trends of Distributed Computing Systems (FTDCS'04), pp. 80-85.

*Primary Examiner* — Syed A. Zia
(74) *Attorney, Agent, or Firm* — Marger Johnson & McCollom, P.C.

(57) ABSTRACT

A client platform can be verified prior to being granted access to a resource or service on a network by validating individual hardware and software components of the client platform. Digests are generated for the components of the client platform. The digests can be collected into an integrity report. An authenticator entity receives the integrity report and compares the digests with digests stored in either a local signature database, a global signature database in an integrity authority, or both. Alternatively, the digests can be collected and stored on a portable digest-collector dongle. Once digests are either validated or invalidated, an overall integrity/trust score can be generated. She overall integrity/trust score can be used to determine whether the client platform should be granted access to the resource on the network using a policy.

25 Claims, 16 Drawing Sheets

U.S. PATENT DOCUMENTS

| | | | |
|---|---|---|---|
| 5,919,257 A | 7/1999 | Trostle | |
| 6,157,721 A | 12/2000 | Shear et al. | |
| 6,209,091 B1 | 3/2001 | Sudia et al. | |
| 6,289,460 B1 | 9/2001 | Hajmiragha | |
| 6,327,652 B1 | 12/2001 | England et al. | |
| 6,393,420 B1 | 5/2002 | Peters | |
| 6,470,448 B1 | 10/2002 | Kuroda et al. | |
| 6,609,200 B2 | 8/2003 | Anderson et al. | |
| 6,823,454 B1 | 11/2004 | Hind et al. | |
| 6,826,690 B1 | 11/2004 | Hind et al. | |
| 6,976,087 B1 | 12/2005 | Westfall et al. | |
| 6,978,366 B1 | 12/2005 | Ignatchenko et al. | |
| 7,003,578 B2 | 2/2006 | Kanada et al. | |
| 7,024,548 B1 | 4/2006 | O'Toole, Jr. | |
| 7,100,046 B2 | 8/2006 | Balaz et al. | |
| 7,178,030 B2 | 2/2007 | Scheidt et al. | |
| 7,268,906 B2 | 9/2007 | Ruhl et al. | |
| 7,272,719 B2 | 9/2007 | Bleckmann et al. | |
| 7,457,951 B1 | 11/2008 | Proudler et al. | |
| 7,461,249 B1 | 12/2008 | Pearson et al. | |
| 7,774,824 B2 * | 8/2010 | Ross | 726/2 |
| 7,904,727 B2 * | 3/2011 | Bleckmann et al. | 713/176 |
| 7,987,495 B2 * | 7/2011 | Maler et al. | 726/1 |
| 2002/0095589 A1 | 7/2002 | Keech | |
| 2002/0144149 A1 | 10/2002 | Hanna et al. | |
| 2002/0150241 A1 | 10/2002 | Scheidt et al. | |
| 2003/0014755 A1 | 1/2003 | Williams | |
| 2003/0028585 A1 | 2/2003 | Yeager et al. | |
| 2003/0097581 A1 | 5/2003 | Zimmer | |
| 2003/0177394 A1 | 9/2003 | Dozortsev | |
| 2004/0205340 A1 | 10/2004 | Shimbo et al. | |
| 2005/0033987 A1 | 2/2005 | Yan et al. | |
| 2005/0132122 A1 | 6/2005 | Rozas | |
| 2005/0138417 A1 | 6/2005 | McNerney et al. | |
| 2005/0163317 A1 | 7/2005 | Angelo et al. | |
| 2005/0184576 A1 | 8/2005 | Gray et al. | |
| 2005/0278775 A1 * | 12/2005 | Ross | 726/2 |
| 2006/0005254 A1 * | 1/2006 | Ross | 726/27 |
| 2006/0048228 A1 * | 3/2006 | Takemori et al. | 726/22 |
| 2006/0074600 A1 | 4/2006 | Sastry et al. | |
| 2006/0173788 A1 | 8/2006 | Nath Pandya et al. | |
| 2007/0050622 A1 | 3/2007 | Rager et al. | |
| 2007/0130566 A1 | 6/2007 | van Rietschote et al. | |
| 2007/0143629 A1 | 6/2007 | Hardjono et al. | |
| 2007/0174429 A1 | 7/2007 | Mazzaferri et al. | |
| 2007/0180495 A1 * | 8/2007 | Hardjono et al. | 726/3 |
| 2008/0092235 A1 | 4/2008 | Comlekoglu | |
| 2008/0256363 A1 | 10/2008 | Balacheff et al. | |
| 2008/0267406 A1 * | 10/2008 | Asokan et al. | 380/277 |
| 2009/0089860 A1 | 4/2009 | Forrester et al. | |
| 2011/0320816 A1 * | 12/2011 | Yao et al. | 713/171 |
| 2012/0023568 A1 * | 1/2012 | Cha et al. | 726/10 |

FOREIGN PATENT DOCUMENTS

| | | |
|---|---|---|
| WO | WO2008/024135 A3 | 2/2008 |
| WO | WO/2008/030629 A1 | 3/2008 |
| WO | WO/2009/018366 A1 | 2/2009 |

* cited by examiner

METHOD TO VERIFY THE INTEGRITY OF COMPONENTS ON A TRUSTED PLATFORM USING INTEGRITY DATABASE SERVICES

RELATED APPLICATION DATA

This application claims the benefit of commonly-assigned U.S. Provisional Patent Application Ser. No. 60/749,368, titled "METHOD TO VERIFY THE INTEGRITY OF COMPONENTS ON A TRUSTED PLATFORM USING INTEGRITY DATABASE SERVICES", filed Dec. 9, 2005, and commonly-assigned U.S. Provisional Patent Application Ser. No. 60/759,742, titled "METHOD AND APPARATUS FOR IP NETWORK ACCESS CONTROL BASED ON PLATFORM COMPONENT SIGNATURES AND TRUST SCORES," filed Jan. 17, 2006, which are incorporated by reference. This application is a continuation-in-part of commonly-assigned U.S. patent application Ser. No. 11/288,820, titled "Method to control access between network endpoints based on trust scores calculated from information system component analysis", filed Nov. 28, 2005 now U.S. Pat. No. 7,272,719, which claims the benefit of commonly-assigned U.S. Provisional Patent Application Ser. No. 60/637,066, titled "METHOD TO CONTROL ACCESS BETWEEN NETWORK ENDPOINTS BASED ON TRUST SCORES CALCULATED FROM INFORMATION SYSTEM COMPONENTS", filed Dec. 17, 2004; U.S. Provisional Patent Application Ser. No. 60/631,449, titled "METHOD TO HARVEST, SUBMIT, PERSIST, AND VALIDATE DATA MEASUREMENTS EMPLOYING WEB SERVICES," filed Nov. 29, 2004, and U.S. Provisional Patent Application Ser. No. 60/631,450, titled "METHOD TO VERIFY SYSTEM STATE AND VALIDATE INFORMATION SYSTEM COMPONENTS BY MEANS OF WEB SERVICES USING A DATABASE OF CRYPTOGRAPHIC HASH VALUES," filed Nov. 29, 2004, which are hereby incorporated by reference.

FIELD OF THE INVENTION

This application pertains to trusted computing and network security, and more particularly, to determining the integrity of client platform components before granting the client platform access to a resource or service available on a network.

BACKGROUND OF THE INVENTION

The expansive growth of the Internet changed the world. In the late 1970s and early 1980s, the Internet was still in its nascency and was comprised primarily of interconnected computers dedicated to defense and academia disciplines. In the early 1990s, the Internet gained a public face. As the Internet became more accessible to the public, it also became significantly larger and more complex. As a result, the Internet grew to become heterogeneous—particularly in the sense that software and hardware developers created myriad devices that could be attached to the Internet. These creations continued to evolve to the point where, today, devices capable of being attached to the Internet are highly diverse. It is common to have PC clients, servers, Personal Digital Assistants (PDAs), mobile phones, routers, and other network-connected devices all interconnected via the Internet. These interconnected devices present challenges—on both a local and global scale—in the areas of security and authentication.

In the often wild frontier of the Internet, undesirable trends are stirring. Unscrupulous individuals illegally sell counterfeit hardware and software components into grey-markets. Software piracy, viruses, worms, and other dangers also pose threats. Such dangers threaten the security and well-being of the Internet, its users, and their data. Business owners, who rely on the Internet to facilitate business transactions, realize the need to confront these ever-increasing threats, where it is considered paramount to the survival of their businesses. Similarly, individual users of the Internet worry about the integrity and safety of their own data, which can include private information such as personal financial banking information. The integrity of end-points on a network has become a major issue of concern for the businesses and networking industry.

Antivirus software, spam filters, and other software products that exist today attempt to address some of these problems by identifying, thwarting, and eliminating computer viruses, other malicious software, and other attempts to take advantage of users. But thwarting viruses, by itself, does not solve the problem of ensuring the integrity of software and hardware components of a client platform. In particular, these software products are incapable of determining whether hardware and software are genuine components that conform to a trusted and known standard. For example, antivirus software fails to stop problematic computer systems from logging onto a network, even where the computers systems are suspected of carrying malicious software and does not check the integrity of hardware components, nor does it take any preventative action in the event where a client platform may have illegitimate components.

Despite efforts by antivirus software manufacturers, an increasing amount of malware is being introduced into corporate networks through "tainted" machines. For example, this can happen when an employee takes a laptop computer on a business trip and connects to a network, such as the Internet, which is external to the corporate network. The machine is then "tainted" by some form of malware. The "tainted" machine is then brought back into the corporate network, where it can pose a threat to the integrity of the entire corporate network. In light of recent legislation such as the Sarbanes-Oxley Act, which requires Chief Information Officers (CIOs) to be responsible for the security, accuracy, and the reliability of the systems that manage and report financial data, machine integrity can be particularly important.

Banks are a good example of an institution that is especially vulnerable to client platforms containing malware and other illegitimate components. Inherently, banks store sensitive financial information, and naturally have a desire to ensure that the information remains secure. Today, it is difficult for banks to know—to any degree of certainty—whether a given client platform requesting access to the banks' networks has the required overall integrity necessary to transact, and does not pose a significant threat to their networks.

Accordingly, a need remains for a way to identify and authenticate components of a client platform—both hardware and software—that are in a potentially improper state before the client platform is given access to network services or resources. The present application addresses these and other problems associated with the prior art.

SUMMARY OF THE INVENTION

The present application includes a method and apparatus for authenticating a client platform, generating an integrity report for at least one component of the client platform, signing the integrity report, and gaining access to a resource or service on a network by comparing the integrity report to a plurality of integrity/trust records stored in a database of an integrity authority.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
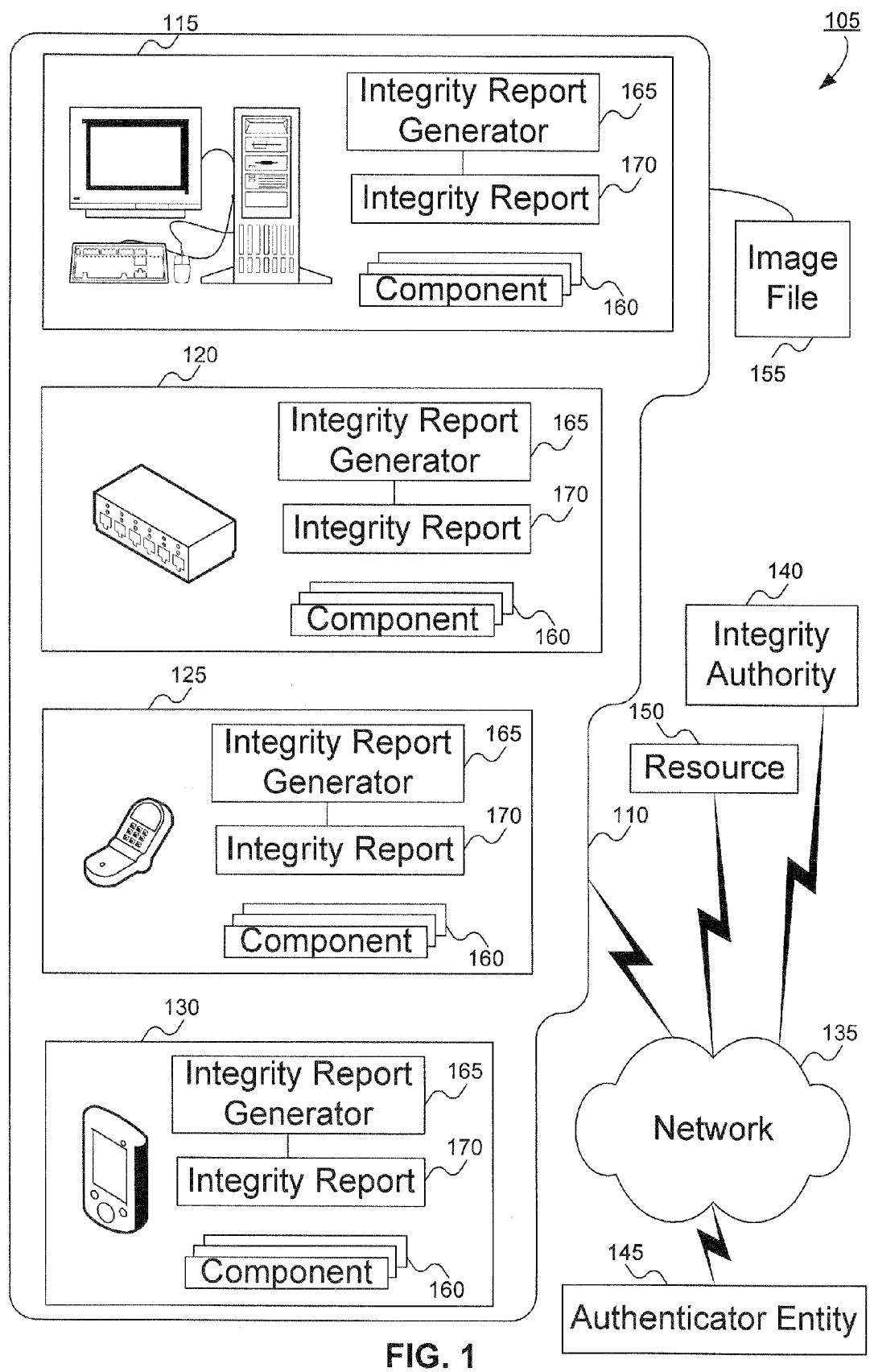
FIG. 1 shows a system including various client platforms whose integrity can be verified using a client platform validation, according to an embodiment of the invention.

An embodiment of the invention evaluates the integrity of software and hardware modules and components (collectively called "components") of a supplicant (also called a "client platform"). The client platform collects information—sometimes referred to as "digests" or "signatures"—of components to be verified. The digests are assembled into a client integrity report, referred to herein as "integrity report." The integrity report can be transmitted to a server, typically an authentication server or other authenticator entity. The digests can then be compared with component integrity/trust records (referred to herein as "integrity/trust records"), previously harvested by an integrity authority as further explained below. The comparison can result in a determination of the trustworthiness of the client platform.

The integrity authority includes a database containing the integrity/trust records. In one embodiment, a global signature database (GSDB) provides integrity/trust records which contain information about myriad software and hardware components, the information having been previously harvested from software and hardware manufacturers, refined, and assigned individual integrity/trust scores. In another embodiment, a local signature database (LSDB) provides the integrity/trust records, and can be periodically updated/synchronized with the GSDB.

In one embodiment, the digests can be obtained from off-the-shelf products by harvesting records from a purchased version. In another embodiment, the digests can be harvested from the manufacturer by uploading or otherwise obtaining the information through a direct means. The latter method should generally allow for more certainty about the "chain of custody" of the component because there are fewer interveners (e.g., owners) who could theoretically tamper with the components of the product in an attempt to circumvent technological protection measures. Generally, the fewer the number of interveners in the chain of custody, the less likely that tampering with components of the product occurs, although a person skilled in the art will recognize that this is not a true "rule". A person skilled in the art will also recognize other ways in which the digests can be harvested, other than from off-the-shelf products or direct from the manufacturer.

The authenticator entity can use the information in the database to assess a level of trustworthiness of the client platform by comparing the integrity/trust records of the database with individual components stored in the integrity report received from the client platform, and computing an overall integrity/trust score for the client platform. The overall integrity/trust score can be influenced by several factors. For example, the chain of custody of the component whose digest is stored in the integrity record can influence the individual integrity/trust scores assigned to the component of the integrity/trust record, and ultimately influence the overall integrity/trust score determined for the client platform. As discussed above, a digest harvested directly from the manufacturer is more likely to be trustworthy than a harvest digested from an off-the-shelf product; and if the digest is more trustworthy, then the digest can potentially lead to greater "trustworthiness" for the client platform. Another factor in determining the "trustworthiness" of the client platform can be the type of certificate used to sign the integrity report. Once the overall integrity/trust score has been determined, that value can be used for additional decision-making and, according to a predetermined policy, can be used in determining whether to grant or deny the client platform access to a resource or service on a network.

FIG. 1 shows system 105 including various client platforms 110 such as personal computer 115, network element 120, wireless phone 125, and personal digital assistant (PDA) 130. A person skilled in the art will also recognize that there are other types of clients which can be used with system 105 such as notebook computers, kiosks, and digital cameras. Each of client platforms 110 can be connected to network 135. Network 135 can be any network which provides interconnections between devices. Example networks can include local area networks (LANs), wide area networks (WANs), metropolitan area networks (MANs), and global networks such as the Internet. Further, the network can use any desired form of connection, including wired connections such as the IEEE 802.3 standard (Ethernet), wireless connections such as any of the IEEE 802.11 standards, or any desired combination of wired and wireless networks.

Integrity authority 140 and authenticator entity 145 are also shown as attached to network 135. As discussed below with respect to FIG. 2, authenticator entity 140 can include one or more servers, such as an authentication server, a verification server, and a policy server, according to various embodiments of the invention. Similarly, integrity authority 145 can include one or more servers to perform the functions described below. Although integrity authority 140 and authenticator entity 145 are shown separately in FIG. 1, a person skilled in the art will recognize that the functions of integrity authority 140 and authenticator entity 145 can be combined and operated by the same physical machine, or by virtual machines running on the same physical machine (virtualization is discussed below). For example, where integrity authority 140 and authenticator entity 145 are both controlled by a single company, it can make sense to have one server fulfill the functions of both machines. Integrity authority 140 and authenticator entity 145 work in conjunction to perform client platform validation and to determine whether to grant or deny access to resource 150. Resource 150 can be a service including a web service or application, a server, a network (such as a network internal to an organization, to which controlled access is provided), a printer, a flash memory disk or other solid state memory device, one or more storage devices, and an output or display, among other possibilities.

Integrity authority 140 stores data about components—as discussed above, both hardware and software components. This data can be provided to other entities (e.g., authenticator entity 145) on network 135. Integrity authority 140 is explained in more depth below in the description of FIGS. 3 and 4.

Image file 155 can be installed on a client platform such as client platform 110. Various methods and embodiments of installing image file 155 are discussed in further detail below. The various entities shown in FIG. 1 include receivers and transmitters to receive/transmit various pieces of data among the machines in system 105. Their operation will also be discussed in further detail below.

While the above description describes integrity authority 140 and authenticator entity 145 as consisting of servers, a person skilled in the art will recognize that integrity authority 140 and authenticator entity 145, along with any other machines described below, can all be virtualized. That is, each of the machines described below can in fact be instantiated as virtual machines running on one or more computers, divided in any desired configuration. In fact, it is possible to instantiate all of the machines involved in determining the integrity of client platform 110 as virtual machines running on a single piece of hardware, with the virtual machines communicating as though they were all distinct pieces of hardware. Or, integrity authority 140 and authenticator entity 145 can be instantiated as virtual machines running on client platform 110, optionally under protected domains. A person skilled in the art will recognize other possible configurations of virtual machines. This virtualization of machines hardware also applies to all other machines described below, whether or not explicitly recited.

Figure 2:
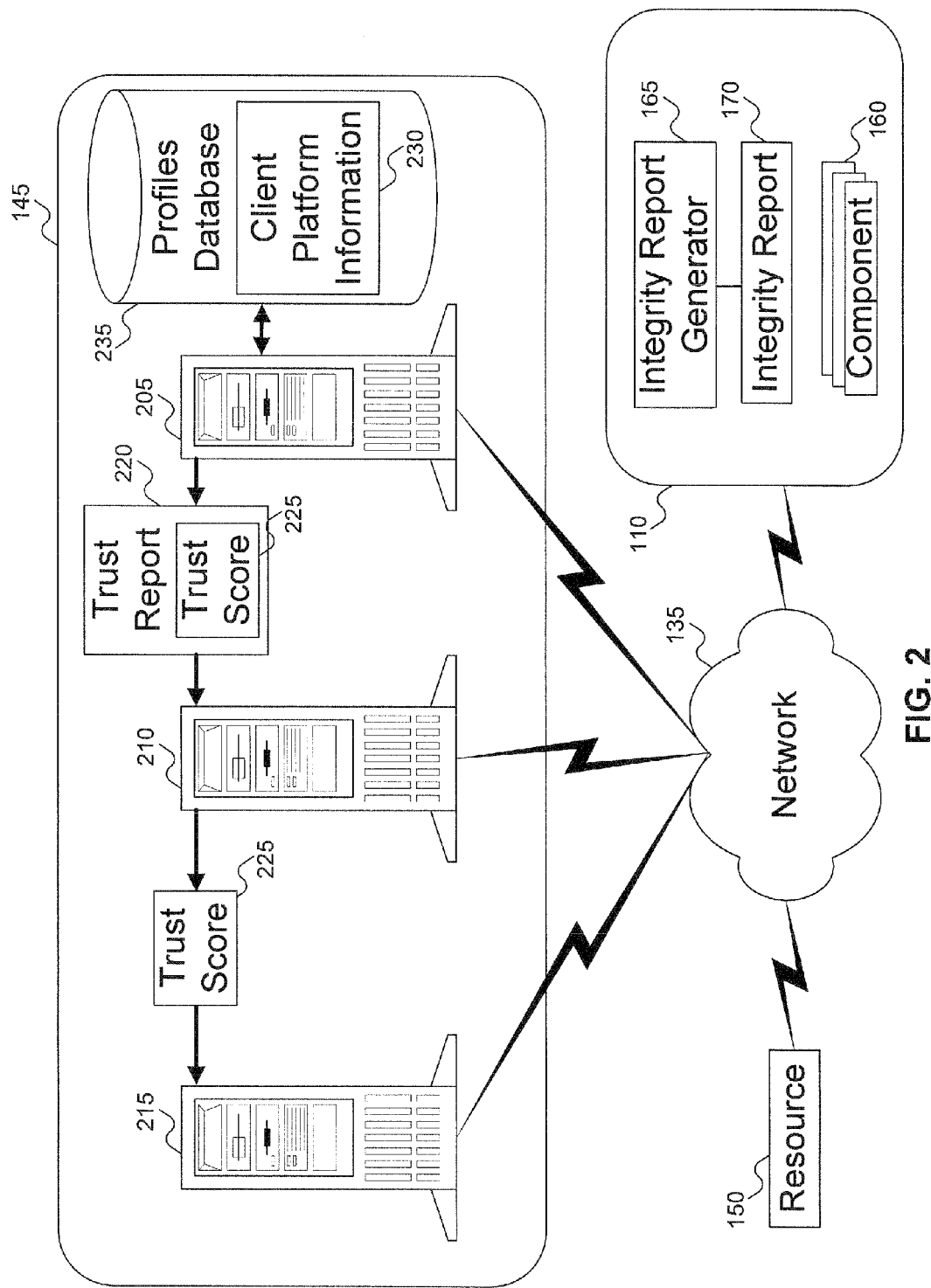
FIG. 2 shows details of the authenticator entity of FIG. 1.

FIG. 2 shows one embodiment of authenticator entity 145, in which authenticator entity includes verification server 205, authentication server 210, and policy server 215. Although FIG. 2 suggests that authenticator entity 145 is located in a single place, with verification server 205, authentication server 210 and policy server 215 are co-located, a person skilled in the art will recognize that the servers can be located separately. In another embodiment, authenticator entity 145 includes verification server 205 and policy server 215, with the functions of authentication server 210 performed by verification server 205. In yet another embodiment, authenticator entity 145 includes a single server with the functions of authentication server 210 and policy server 205 performed by verification server 205 alone. A person skilled in the art will recognize other combinations of the functions of verification server 205, authentication server 210, and policy server 215. In other words, according to various embodiments of the invention, any of the functions performed by the various server entities of FIG. 2 can be performed by one or more servers. Policy server 215 is called the Policy Decision Point (PDP) and authentication server 210 is called the Policy Enforcement Point (PEP).

Verification server 205 is responsible for verifying the integrity status of client platforms 110. Each client platform (e.g., 115, 120, 125, and 130 of FIG. 1) collects information—sometimes referred to as "digests" or "signatures"—about its components 160. This information can be collected from platform configuration registers (PCRs) inside a Trusted Platform Module (TPM) chip. The TPM chip is a security-hardware chip standardized and promoted by the Trusted Computing Group (TCG) consortium. Security features of the TPM chip distinguish it from other hardware-based security technologies such as smartcards. For example, the TPM chip includes integrity measurement, metric gathering, and reporting capabilities (storing digests of the metrics into PCRs). The TPM chip also supports "shielded locations," which provide safe locations in memory where sensitive operations can occur without risking loss of data or exposure to unauthorized commands. Further, the TPM chip supports "protected capabilities," which are a set of commands with exclusive permission to access the shielded locations. These, and other features, make the TPM chip ideal for a trusted computing environment.

Digests can also be derived from other locations or characteristics specific to the platform. For example, there can be other non-TPM related registers, applications, processes, services, threads, or the like, which provide authoritative source-authentic information about components 160 of client platform 110. When generating digests of application software, digests can be generated from any files that are part of the application, with each such file being considered a component. For example, if a software suite includes a word processor, a spreadsheet, and an e-mail package, digests can be generated for each executable application and each linked library file that is part of the suite, among other possibilities. In one embodiment, every file that is part of the software application is considered a component; in another embodiment, components are more selectively identified. A person skilled in the art will recognize how to identify components of other software applications.

Digests can include hashes of components 160. Hashes of components can be generated using one-way cryptographic hash functions such as MD5, SHA-1, SHA-256; a person skilled in the art will recognize other possible hash functions that can be used. Integrity report generator 165 collects all of the digests (including the hashes and other derived information) and generates integrity report 170. Integrity report 170 can be digitally signed, as further discussed in the description of FIG. 6, to verify the identity of the client platform from which integrity report 170 is received.

Client platform 110 engages in a platform integrity verification handshake with authentication server 210. In one embodiment, the platform integrity verification handshake can include multiple interactions between client platform 110 and authentication server 210 during a platform authentication session, beginning with an initial request by client platform 110 for access to resource 150, and ending with a decision to grant or deny client platform 110 access to the resource. In another embodiment, authentication server 210 can use trust report 220 as part of the authentication of client platform 110. If client platform 110 is denied access, a final acknowledgment and termination of the session can occur. If client platform 110 is granted access, the final acknowledgment and termination can occur later. A person skilled in the art will recognize that the final acknowledgment and termination might be postponed, and in some cases, might never happen at all. During the platform integrity verification, verification server 205 evaluates the digests of components 160 as contained in integrity report 170 generated by integrity report generator 165.

In one embodiment, verification server 205 performs the evaluation to assess a trust level of client platform 110. Verification server 205 also generates trust report 220, which includes overall integrity/trust score 225 according to the evaluation of client platform 110. Authentication server 210 provides overall integrity/trust score 225 to policy server 215, which decides whether to grant or deny client platform 110 access to resource 150. If policy server 215 denies client platform 110 access to the resource, client platform 110 can be informed of the refusal. For example, if components 160 of client platform 110 have "drifted"—varied from the recognized digest for the component—such that client platform 110 is no longer trusted, the required remediation might be for client platform 110 to be re-imaged using image file 155, or otherwise wiped clean. Alternatively, remediation might involve reinstalling or removing the component that has "drifted" before access to resource 150 is granted. Or client platform 110 might be granted access to resource 150, but perhaps at a reduced level of access until client platform 110 addresses the "drift". A person skilled in the art will recognize other possible approaches to handling component "drift".

In another embodiment, authenticator entity 145 can provide trust report 220 to client platform 110. This can allow client platform 110 to use trust report 220 as a sort of "trust ticket" to access other network resources or services. The other network resources or services can also have an authenticator entity to check the validity of trust report 220. A person skilled in the art will recognize that any number of resources or services can be accessed by client platform 110 using trust report 220.

Trust report 220 includes, aside from trust score 225, an indication as to which machines acted as authenticator entity 145 and integrity authority 140. This information can be used to determine the trustworthiness of trust score 225. A third party can then use this information to determine which machines were responsible for generating trust score 225. As a specific example, if authenticator entity 145 and/or integrity authority 140 are virtual machines, this information can include an identification of the physical machines on which the virtual machines are instantiated. Thus, for example, if authenticator entity 145 and integrity authority 140 are both instantiated on client platform 110, a third party would be aware that the virtual machines in question were instantiated on the same physical hardware platform that was be analyzed for trustworthiness.

Verification server 205 can store client platform information 230 in profiles database 235. Client platform information 230 can include, among other possibilities, the following: integrity report 170, and trust report 220 containing overall integrity/trust score 225. Client platform information 230 can also include other items such as: date/time of the evaluation, client platform configuration information, integrity profiles (herein referred to as "scan policies"), user information, and machine specific information. Verification server 205 can use information stored in profiles database 235 to enforce the scan policies. For example, an organization might require certain users, such as those in a finance department, to have one set of components on client platform 110, while requiring other "ordinary" users to have a different set of components. Additionally, sub-policies can require that particular persons within the finance department, such as the chief financial officer, have additional required components. The scan policy can determine not only which components are present, but also to what extent and by what method a particular client is scanned. While the above example shows scan policies implemented with two sets of requirements, a person skilled in the art will recognize that any number of requirements and tiers of scan policies can be implemented.

Policy server 215 can implement a customized policy for a given institution. For example, consider a bank. Where customers of the bank desire to access their bank accounts through client platform 110, policy server 215 can choose to give tiered access to bank account information according to overall integrity/trust score 225. For example, if overall integrity/trust score 225 exceeds a first threshold, access can be granted to a subset of account information or account resources, such as account balances, account statements, among other possibilities. If overall integrity/trust score 225 exceeds a second higher threshold, access can be granted to a higher level of account information or account resources, such as the ability to perform money wire transfers. While the above example shows policies implemented with two sets of resource access using two trust score thresholds, a person skilled in the art will recognize that any number of thresholds and tiers of access can be implemented.

Figure 3:
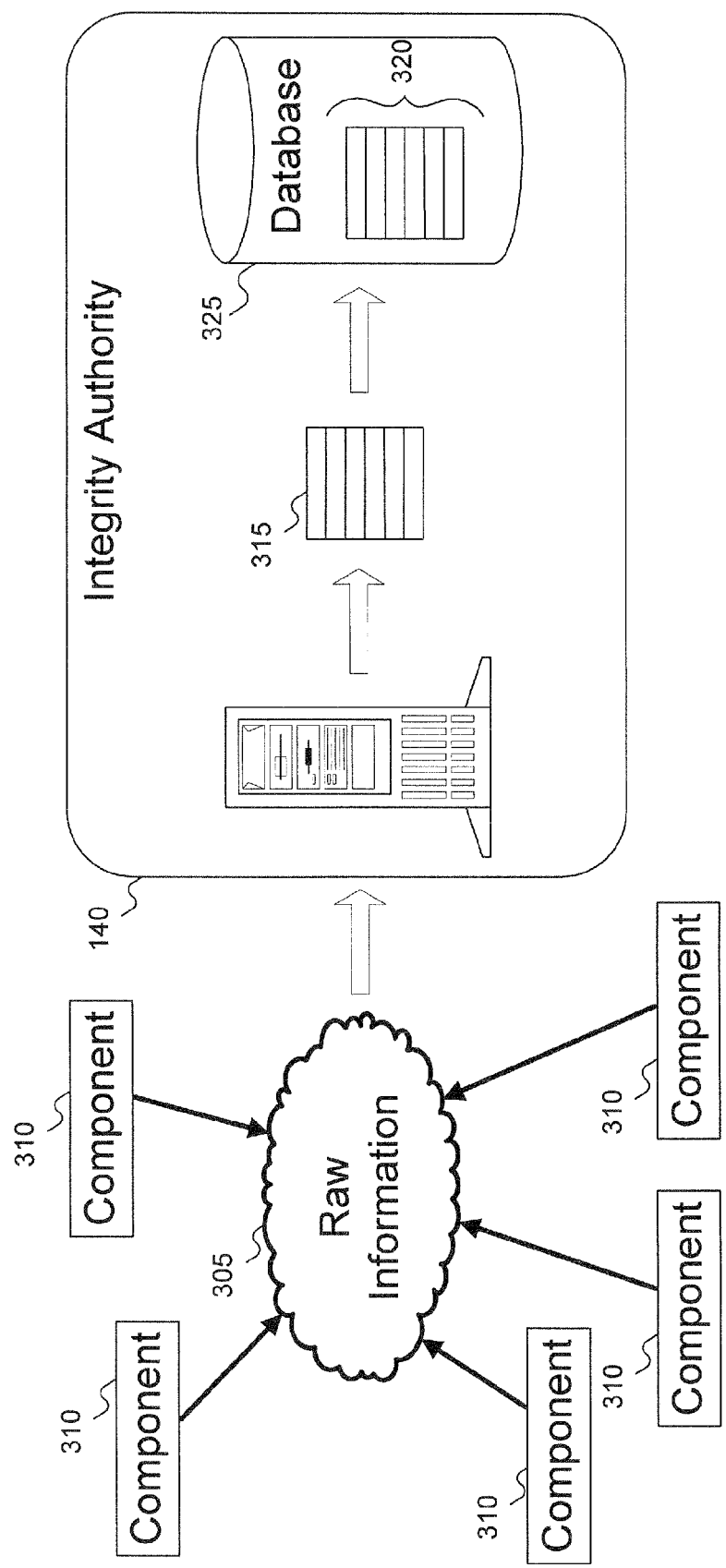
FIG. 3 shows the integrity authority of FIG. 1 harvesting raw information from components.

FIG. 3 shows integrity authority 140 according to an embodiment of the invention to harvest raw information 305 of components 310, to verify and refine information 315 (including digests of the components), and to store refined information 315 as integrity/trust records 320 in Global Signature Database (GSDB) 325. More specifically, integrity authority 140 harvests raw information 305 about components 310 from their sources (e.g., manufacturers, software vendors, and hardware vendors, among other possibilities). As previously mentioned, the digests can be obtained from off-the-shelf products by harvesting records from a purchased version, directly from the manufacturer by uploading or otherwise obtaining the information through a direct means, or using other techniques. It is desirable that the technique that results in the highest overall level of trust in the component harvest be used: for example, that the "chain of custody" of the component be as secure as possible. Authenticator entity 145 (of FIG. 1) can use the information in GSDB 325 to assess a level of trustworthiness of client platform 110 (of FIG. 1) by comparing integrity/trust records 320 of GSDB 325 with individual components stored in integrity report 170 (of FIG. 1) received from client platform 110 (of FIG. 1), and assigning overall integrity/trust score 225 (of FIG. 2) to client platform 110 (of FIG. 1).

After harvesting the information, integrity authority 140 verifies the correctness of the information using predetermined heuristics. In one embodiment, the heuristics are applied through automatic means of a computer application or program. In another embodiment, a manual verification is performed by an authorized individual. In either embodiment, information is harvested and stored in standardized format 315. For example, a canonization of raw information 305 can occur such that the raw information can be refined 315 and stored in the form of integrity/trust records 320. Additionally, integrity/trust records 320 can be further verified by submitting the harvested information back to the original manufacturer or vendor for validation. This can be referred to as "closing the loop" on harvested data.

Integrity/trust records 320 can be made available for look-up operations, wherein a verification server can attempt to verify the integrity of a client platform using the client platform's integrity report, as discussed above with reference to FIG. 2. In one embodiment, the look-up operations can be initiated by verification server 205 of FIG. 2 through a web-services interface. The look-up operation can be performed sequentially on a per-component basis. Alternatively, the look-up operation can be a single message or a batch process containing multiple look-up requests. Additionally, the look-up operation can be performed against constrained sets or categories of information and digests stored in GSDB 325. This would be done to constrain the scope of the search and improve the performance of GSDB 325. A person skilled in the art will recognize that constraining the scope of the search can be accomplished by making use of pattern matching and set theory, among other possibilities. A person skilled in the art will also recognize other ways in which the look-up operations can be performed: for example, through a direct connection, non-web-services interface, or any other network means.

Figure 4:
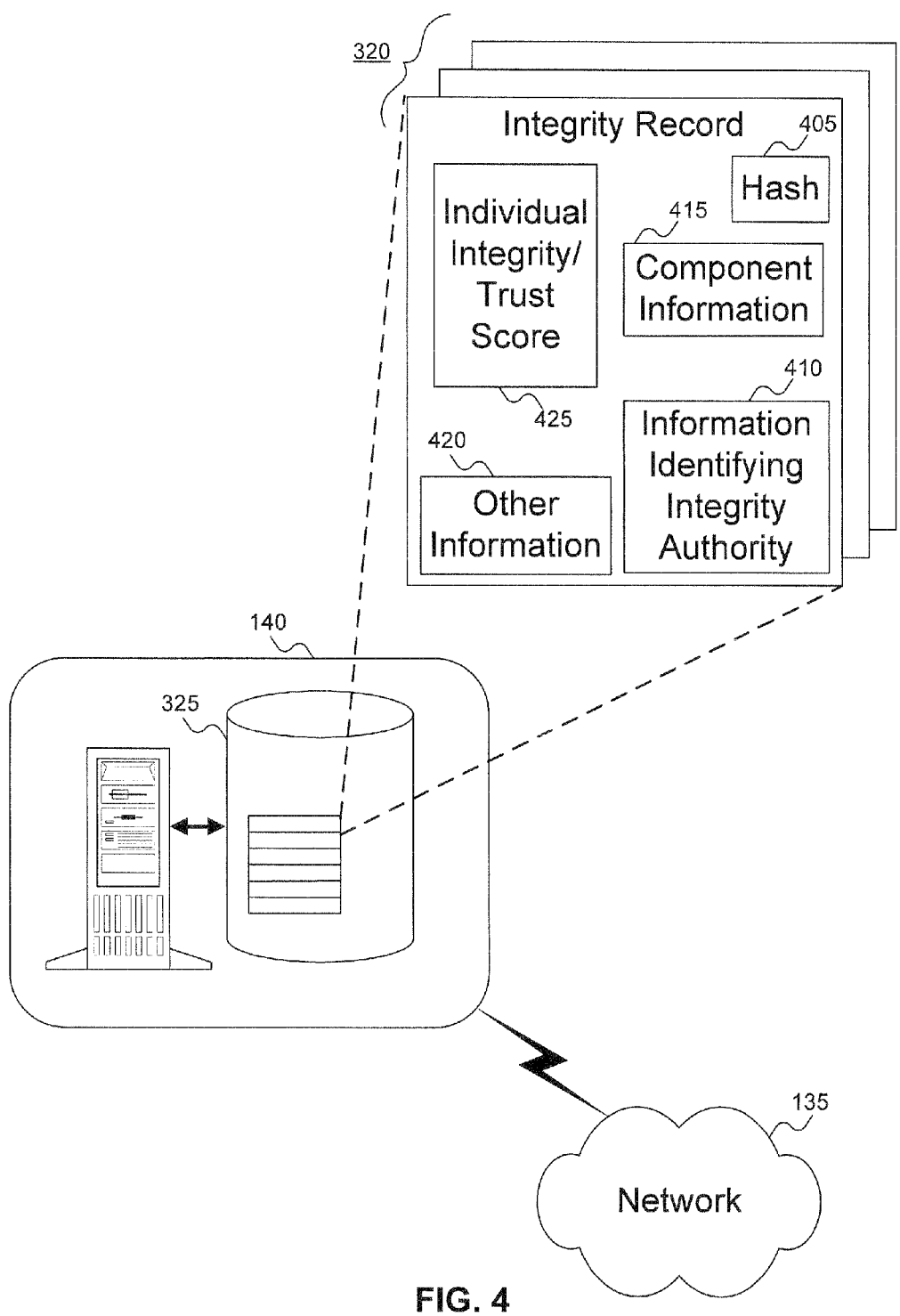
FIG. 4 shows details of the integrity/trust records of FIG. 3.
Figure 5:
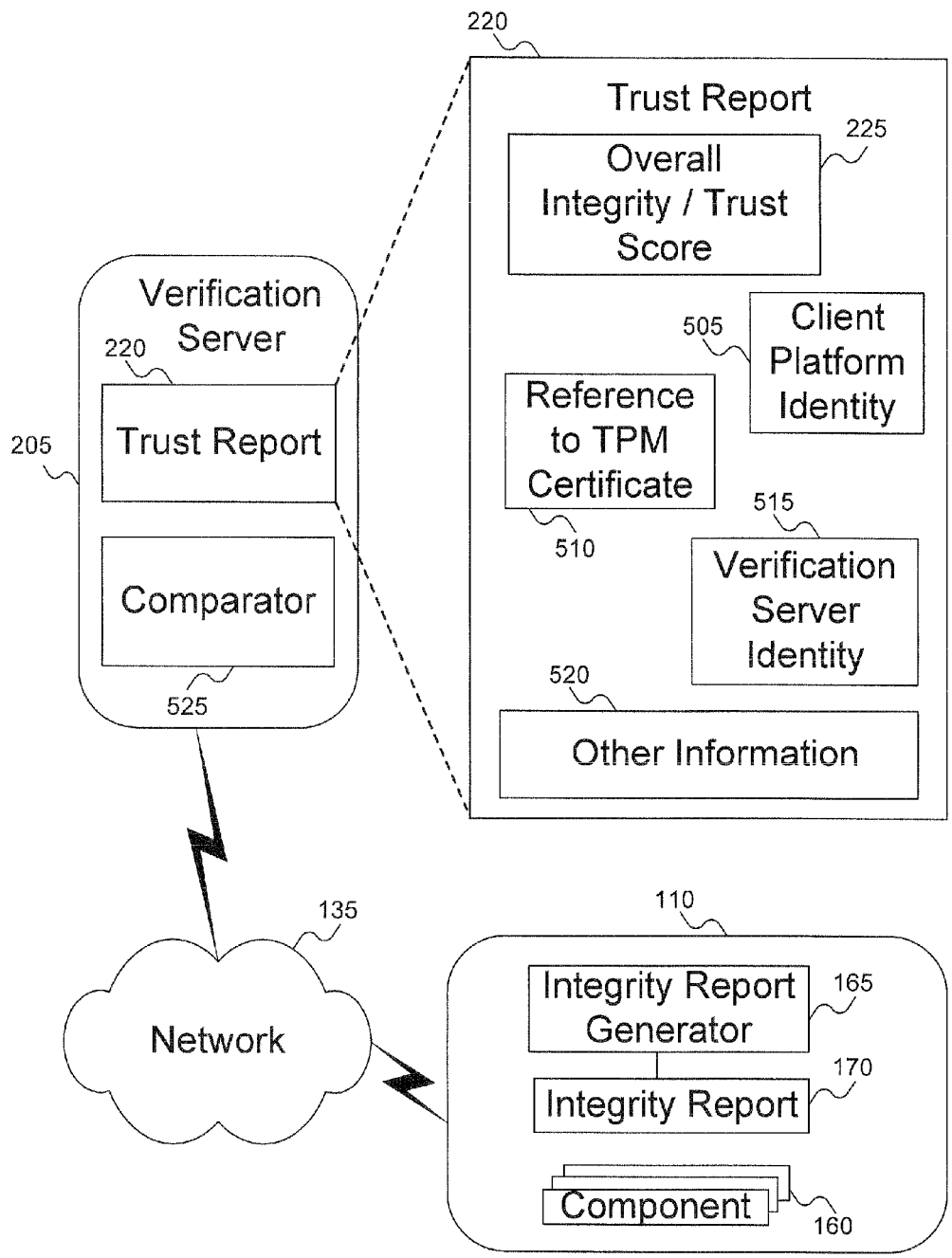
FIG. 5 shows details of the verification server of FIG. 2.

FIG. 4 shows an enlarged view of integrity/trust records 320 according to an embodiment of the invention. Integrity authority 140 generates integrity/trust records 320 according to a method described in FIG. 3 above. Each integrity/trust record 320 can include hash 405. Each integrity/trust record 320 can also include information 410 identifying integrity authority 140. Component information 415 can include the following: component identity, description of the component, manufacturer of the component, model number, version release, patch version, date of manufacturing, origin of component (e.g., country, location), among other possibilities. Integrity/trust records 320 of integrity authority 140 can also include other information 420 such as the following:

Record Information
    record serial number
    validity start-date of the current integrity/trust record
    validity end-date of the current integrity/trust record
    record issuer
Harvesting Information
    harvester identity
    method of harvesting
    date/time of harvesting
    assigned integrity/trust score
    hash value
References
    reference(s) to other sub-component integrity/trust records
    reference to original raw manufacturer data
    reference to standard specifications
Signer Information
    identity of the signer (integrity authority)
    reference to certificate of integrity authority
Digital Signature of Integrity Authority FIG. 5 shows verification server 205 according to an embodiment of the invention. An enlarged view of trust report 220 is shown. Trust report 220 can include overall integrity/trust score 225, client platform identity 505 (e.g., a physical serial number), a reference to TPM certificate 510 of verification server 205, and verification server identity 515. TPM certificates (and TPM-related certificates) are generally stored in tamper-resistant hardware and provide an attestation as to the source of the contents of the associated report. Trust report 220 can also include other information 520, such as: one or more references to TPM certificates of the client platform 110, a date/time of the evaluation, and a digital signature of verification server 205, and a reference to the database against which the digests collected from the client platform were compared. (While normally the digests stored in each database should be identical, it is possible that due to delays in synchronization or database policy management the database used in determining the trustworthiness of the client platform was potentially out-of-synch.) Additionally, other information 520 can include a list of one or more components 160, each with a reference to corresponding integrity/trust record 320 in GSDB 325 (shown in FIG. 3). Verification server 205 generates trust report 220 according to the evaluation of client platform 110.

Comparator 525 can be used to compare the digests in integrity report 170 with integrity/trust records 320 in GSDB 325 of FIG. 3. By comparing the digests in integrity report 170 to integrity/trust records 320, verification server 205 can determine a level of trustworthiness for client platform 110. The level of trustworthiness can be represented in trust report 220 as overall integrity/trust score 225.

The type and quantity of digests can influence overall integrity/trust score 225. For example, digests relating to the operating system can be more important than digests relating to game software. Overall integrity/trust score 225 can be influenced not only by factors related to the digests gathered from client platform 110, but also by factors related to the trustworthiness of integrity records 320. As previously discussed, the chain of custody of the component stored in integrity records 320 can influence the individual integrity/trust scores 425 (of FIG. 4) assigned to the component of each integrity/trust record 320, which ultimately can influence overall integrity/trust score 225 determined for client platform 110. Other factors can influence overall integrity/trust score 225, such as the type of certificate used to sign integrity report 170, and the total number of digests collected from client platform 110 vis-à-vis the total number of digests stored in GSDB 325. Additionally, by constraining the number of digest matches against predefined categories or sets, the number of components in and out of a set can be determined, as well as which components are altogether missing.

Commonly-assigned U.S. patent application Ser. No. 11/288/820, incorporated herein by reference, expounds on ways in which overall integrity/trust score 225 can be determined. An integrity/trust score is an indication of a computer system's overall integrity or whether it can be deemed trustworthy. Integrity/trust scores can be generated in many different ways. In one embodiment, the integrity/trust score is the ratio of the number of validated components on the computer system to the total number of components on the computer system (validated or not). In another embodiment, the integrity/trust score can be scaled to a number between 0 and 1000, where 0 represents a completely untrustworthy computer system, and 1000 represents a completely trustworthy computer system. In yet another embodiment, critical components can be weighted more highly than other components, so that a computer system with more validated critical components can score more highly than a computer system with few validated critical components, even if the second computer system has more total components validated. (The definition of "critical" is not intended to refer to components that are "necessary" in all situations for all potential users, but rather to components that are identified as important to the organization in question. Thus, one organization might consider the files relating to the operating system to be "critical", whereas another organization might consider components that are custom developed internally (for whatever purpose) to be "critical". It is possible that a component can be both "necessary" and "critical", but neither quality implies the other.)

There are other ways in which integrity/trust score 225 can be calculated. In another embodiment, positions of the various validated components within the signature database can be used as factors: for example, components that are listed earlier in the signature database can be considered more important than components that occur later in the signature database. Similarly, if integrity report generator 165 (of FIG.

1) can harvest digests of components with an indication of which components are considered more important to the overall integrity of the client platform (for example, by listing the digests in order of importance in integrity report 170), this information can also be factored into integrity/trust score 225. In another embodiment, integrity/trust score 225 can factor in the component identifier. Components manufactured by one manufacturer can be considered more important than components manufactured by another manufacturer. For example, consider components that work in conjunction with an application. Components manufactured by the application manufacturer can be considered more important than components manufactured by third-party manufacturers.

In yet another embodiment, the version and/or patch level of the component can be a factor in calculating the integrity/trust score. For example, given a component that has several versions, more recent versions can be considered more important than older versions. If the validated component is outdated, the resulting integrity/trust score can be lower than an otherwise-identical computer system with a more current version of the same component. On the other hand, if there is reason to doubt the trustworthiness of a new component (for example, the component is known to have a flaw), then the inclusion of the newer version of the component might lead to a lower integrity/trust score.

During the compare operation, verification server 205 parses integrity report 170 and performs a look-up operation to GSDB 325 of integrity authority 140 (of FIG. 3) for each digest in integrity report 170. The look-up operation can be performed sequentially on a per-component basis. Alternatively, the look-up operation can be one or more messages, each containing multiple look-up requests. The look-up operation can also be scoped against certain categories or sets of information to provide more granular results and to improve overall performance of GSDB 325.

In one embodiment, verification server 205 can verify the integrity of client platform 110 before client platform 110 is granted access to resource 150 of network 135. In another embodiment, comparator 525 can perform the compare operation periodically over a period of time, but only after having been granted initial access. For example, a home computer user may attempt to gain access to network 135 prompting an evaluation of components 160. However, broadband connections—which are always "on"—are becoming ubiquitous among home computer users. This can reduce the number of times a user logs into a network, Also, this often holds true among corporate and business computer users alike. As a result, comparator 525 can perform the compare operation at a later time not associated with the initial attempt of client platform 110 to connect to network 135.

Figure 6:
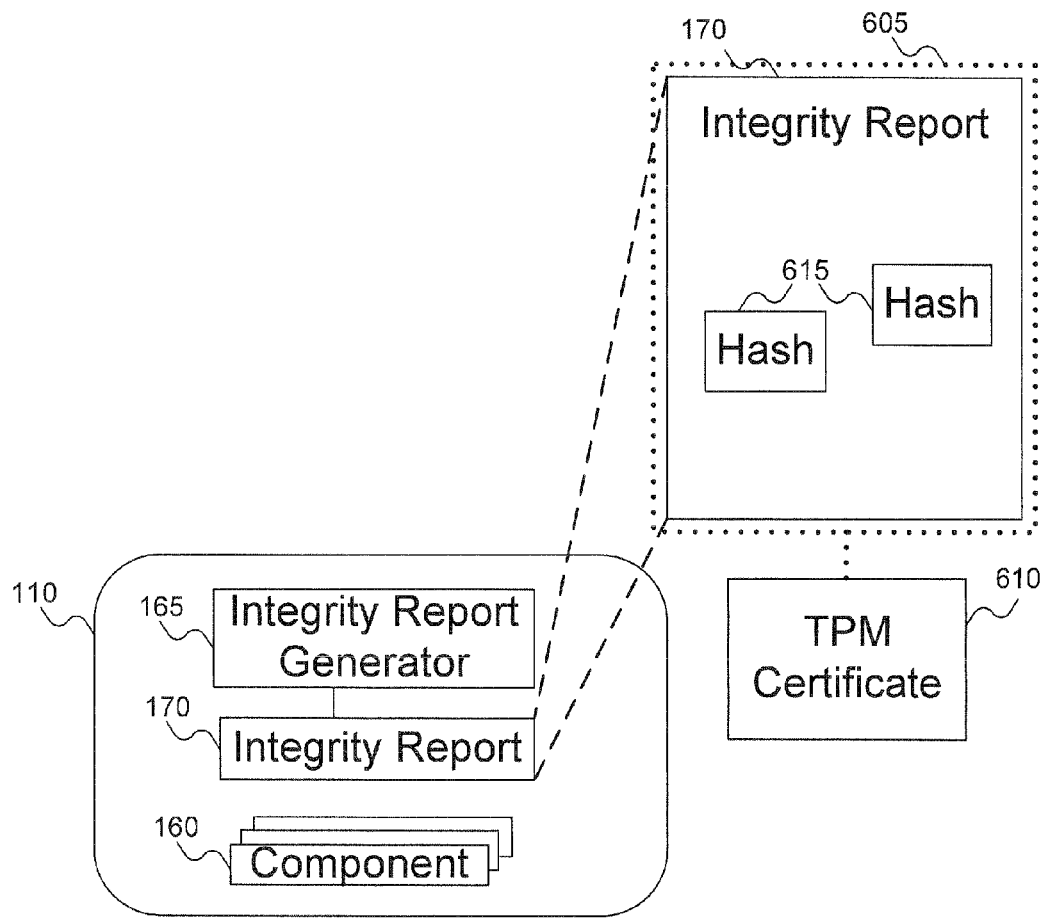
FIG. 6 shows details of the integrity report of FIG. 1.

FIG. 6 shows an enlarged view of integrity report 170 according to an embodiment of the invention. Client platform 110 typically generates integrity report 170 in a standard format or language, such as XML, but a person skilled in the art will recognize that non-standard formats or languages can also be used. Integrity report 170 is shown as digitally signed 605 using TPM certificate 610. A person skilled in the art will recognize that any certificate included with the TPM chip can be used, and therefore TPM certificate 610 can be an Endorsement Key (EK)-certificate, an Attestation Identity Keys (AIK)-certificate, or a Subject Key Attestation Evidence (SKAE)-certificate. Further, a person skilled in the art will also recognize that integrity report 170 can be signed by a certificate derived from a TPM-bound certificate or signed by other certificates, not necessarily TPM certificates.

As discussed above, integrity report 170 can also include digests of components on the client platform. In one embodiment, the digests are calculated as hashes 615 of components 160. In another embodiment, the digests can be compared with digests associated with components stored in integrity/trust records 320 of GSDB 325 (of FIG. 3). In another embodiment, the digests can be compared with a subset of digests associated with components stored in integrity/trust records of a Local Signature Database (LSDB), as further described in FIG. 7, and if not found therein, referring to GSDB 320 for digests not matched in the local database. In yet another embodiment, the local database might be completely synchronized—precisely matching—the digests of the global database, obviating the need in some cases for referring to GSDB 320.

Figure 7:
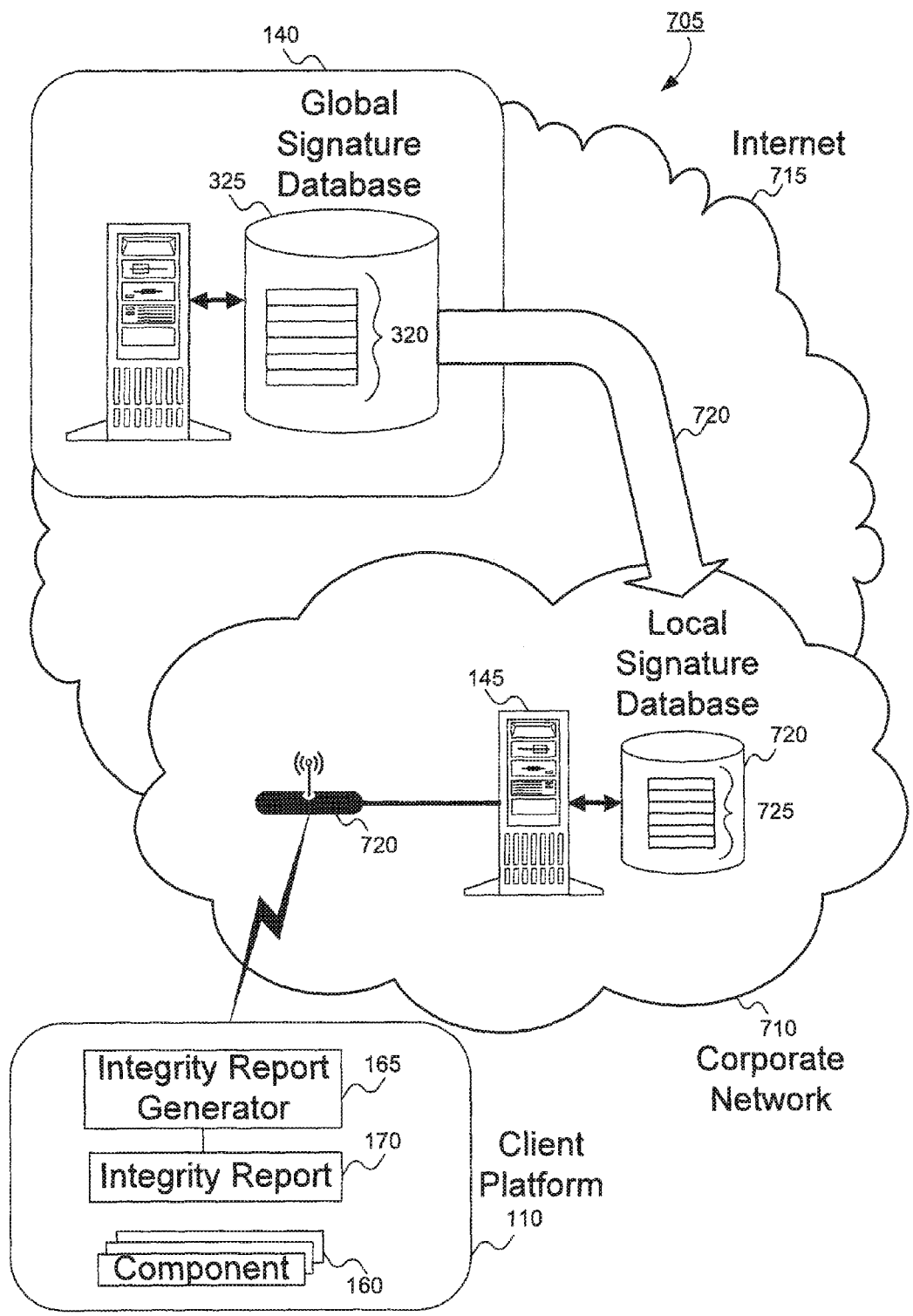
FIG. 7 shows a system including global and local signature databases, according to an embodiment of the invention.

FIG. 7 shows system 705 including client platform 10 attached to authenticator entity 145 of corporate network 710, which can interact with integrity authority 140, according to an embodiment of the invention. Corporate network 710 can be coupled to integrity authority 140 via Internet 715 or any other network, as described above. In FIG. 7, client platform 110 is shown as coupled to authenticator entity 145 wirelessly via corporate wireless access point 720. But a person skilled in the art will recognize that client platform 110 can be connected to corporate network 710 using any form of connection, including wired connections such as the IEEE 802.3 standard (Ethernet), wireless connections such as any of the IEEE 802.11 standards, or any desired combination of wired or wireless networks.

As discussed above, authenticator entity 145 evaluates client platform 110. This evaluation can be done at the time that client platform 110 seeks access to corporate network 710: that is, as part of authenticating client platform 110, before client platform has requested access to any specific resources. Authenticator entity 145 can also evaluate client platform 110 at other times. For example, authenticator entity 145 can periodically reevaluate client platform 110, perhaps according to a corporate policy. In one embodiment, authenticator entity 145 can evaluate components 160 of client platform 110 by requesting integrity report 170 from client platform 110. Client platform 110 creates integrity report 170 using integrity report generator 165. For each digest representing a component 160 in integrity report 170, authenticator entity 145 identifies a corresponding integrity/trust record 725 from LSDB 720, discussed in more detail below. Integrity/trust records 725 are compared with the hashes of components 160 to assess a level of trustworthiness for client platform 110.

In another embodiment, authenticator entity 145 can remotely evaluate client platform 110—for example, by the appropriate server tunneling into the client—and therefore would not request integrity report 170 from client platform 110. Instead, authenticator entity 145 would generate integrity report 170 based on the remote evaluation. The remote evaluation can occur using any number of mechanisms: for example, using Intel® vPro™ technology. (Intel vPro is a trademark or registered trademark of Intel Corporation or its subsidiaries in the United States and other countries.) A person skilled in the art will recognize that other mechanisms can be used.

Integrity/trust records 725 of LSDB 720 are periodically updated and synchronized with integrity/trust records 320 of GSDB 325. This is to ensure that the most recent integrity/trust records are available to LSDB 720. In one embodiment, only integrity/trust records 320 that are pertinent to the operation of corporate network 710 are transferred to LSDB 720. This has the benefit of reducing network traffic and minimizing the size of LSDB 720 by allowing it to store a subset of GSDB 325. When certain of the integrity/trust records of LSDB 720 are no longer needed because of lack of use or other reasons, the records can be removed from LSDB 720 and later retrieved from GSDB 325 when or if needed in the future. For example, if a corporate policy sets forth that only the latest version of virtual private network (VPN) software used by the company is permitted, then integrity/trust records relating to outdated versions of the VPN can be removed from LSDB 720. GSDB 325 and LSDB 720 can also be virtualized. For example, each database can reside on a different virtual machine, on the same or different physical machine. These virtual machines can also reside on client platform 110.

The update/synchronization between GSDB 325 and LSDB 720 can be performed through a secure and authenticated channel, and can be performed when corporate policy indicates the timing is appropriate. For example, if corporate policy indicates that LSDB 720 should always include the most up-to-date pertinent records, then GSDB 325 can provide these records as soon as they are available (for example, by notifying LSDB 720 that new records exist and are awaiting retrieval, or by pushing the records to LSDB 720). On the other hand, if corporate policy dictates that LSDB 720 should be updated when a sufficient number of records are ready for retrieval from GSDB 325, or if corporate policy dictates that LSDB 720 be updated at a time that minimizes inconvenience to corporate employees, then the update/synchronization can be performed when the network or information technology (IT) administrator indicates the timing is appropriate, whether manual, scheduled or otherwise automated.

An update to LSDB 720 can involve supplementing LSDB 720 with new integrity/trust records without replacing existing ones. Similarly, GSDB 325 can also be updated as new information is harvested and new integrity/trust records 725 are created. New integrity/trust records 725 of GSDB do not necessarily replace old ones, but can supplement existing records in GSDB 325.

In another embodiment, an authorized network administrator can add integrity/trust records 725 to LSDB 720 that are specific to corporate network 710 which have only a local relevance. In this situation, LSDB 720 includes records that have no analog in GSDB 325. For example, files which are generated and used only within corporate network 710, such as configuration files and other corporate system data, can have integrity/trust records 725 authored by the legal operator (for example, the network administrator) of corporate network 710. This ensures that authenticator entity 145 has access to all necessary integrity/trust records 725, including those specific to corporate network 710, to perform the evaluation of client platform 110.

With respect to LSDB 720, the subset of integrity/trust records 725 stored locally on corporate network 710 can be checked for a correlation with hashes stored in integrity report 170 of client platform 110 after installation of image file 155 of FIG. 1. If the comparison shows that the hashes of one or more components on the client platform differ from the hashes stored in LSDB 720, the user can be required to re-image client platform 110 using image file 155. Alternatively, remediation might involve reinstalling or removing the components whose hashes differ. Or client platform 110 might be granted access to resource 150, but perhaps at a reduced level of access until client platform 110 addresses the issue. A person skilled in the art will recognize that other remedial measures can be taken. If the number of hashes without a match is insignificant (where "insignificant" can mean that a sufficient number of the hashes of integrity report 170 have a corresponding match with a hash stored in integrity/trust records 725), authenticator entity 145 (of FIG. 1) can grant access to resource 150 (of FIG. 1). Additional use cases involving image file 155 are discussed in further detail below.

Another embodiment can include corporate network 710 designed specifically to guard financial data. For example, federal legislation, such as the Sarbanes-Oxley Act, requires Chief Information Officers (CIOs) to be responsible for the security, accuracy, and the reliability of computer networks, especially with respect to the storage of relevant financial data. By employing system 705, CIOs can maintain a secure and safe network by denying client platforms 110 access to corporate network 710 if they fail an evaluation performed by authenticator entity 145 in conjunction with LSDB 720. Furthermore, different levels of security can be established for different client platforms. For example, the CIO client platform can be required to encrypt all data on the hard drive, whereas a client platform for an ordinary employee would not require such a feature.

Figure 8:
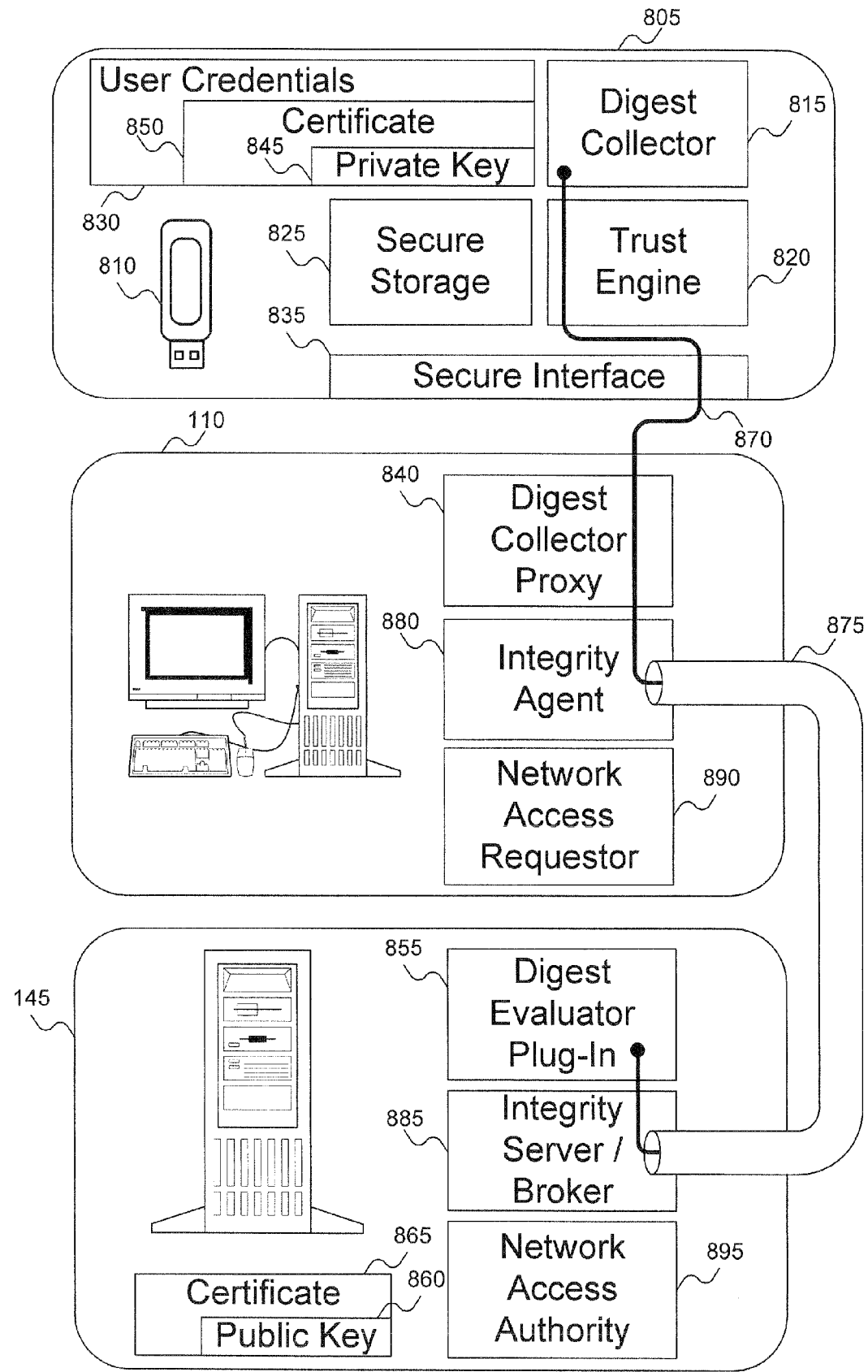
FIG. 8 shows a system including a portable digest-collector dongle, according to an embodiment of the invention.

In yet another embodiment, the modules used to generate integrity report 170 and control access to the resource by client platform 110 are not included on client platform 110, but are external to client platform 110. FIG. 8 shows a portable digest-collector dongle 805, along with client platform 110 of FIG. 1 and authenticator entity 145 of FIG. 2. The various elements shown in FIG. 8 include various receivers and transmitters to receive/transmit various pieces of data among the machines and can be present in other embodiments discussed elsewhere. Dongle 805 can take any of a number of forms, such as USB memory drive 810, a smart card, a token, a memory stick, external hard drive, or a computer peripheral, among other possibilities; a person skilled in the art will recognize other possibilities. Dongle 805 can also be tamper-resistant for added security. If dongle 805 is tamper-resistant, then any attempt to disassemble dongle 805 should result in dongle 805 becoming inoperable. One advantage to using dongle 805 instead of having the various elements used to verify the client platform installed on the client platform is that dongle 805 is human-friendly and more closely binds the user's physical presence to the authentication of client platform 110. For example, a user can attach dongle 805 to any computer, such as a computer in a public library, rather than being limited to a single computer. Dongle 805 can also be attached to client platform 110 even if the client is not attached to another machine or network, and can perform a self-contained platform integrity verification. This embodiment is described in more detail in FIG. 9 below.

Dongle 805 can include digest collector 815, trust engine 820, secure storage 825, credentials 830, and secure interface 835. Digest collector 815 interacts with digest collector proxy 840 on client platform 110 via secure interface 835. Digest collector proxy 840 can be a standard virtual machine (VM) component of client platform 110 such as the System Health Agent (SHA) of Microsoft Corporation. Digest collector proxy 840 can also be a proprietary VM component transferred from dongle 805 to client platform 110 prior to initiating the platform integrity verification. Trust engine 820 provides one or more executables or routines to implement trusted execution of software within dongle 805. Secure storage 825 provides a tamper proof location to store sensitive data, such as private key 845, by exposing a limited set of commands and physical contact points. Dongle 805 can also have a non-secure storage space (not shown). User credentials 830 can include one or more certificates 850. Certificate 850 can conform to the X509 format—a convention to denote fields within the certificate. Example certificates include Secure ID and TPM certificates, among other possibilities, which help to authenticate the user to authenticator entity 145. Certificate 850 can also include private key 845, discussed in further detail below.

In one embodiment, digest collector 815 employs user credentials 830 by encrypting integrity report 170 (of FIG. 1) using private-key 845 prior to transmitting integrity report 170 through digest collector proxy 840 of client platform 110, and ultimately to digest evaluator plug-in 855 of authenticator entity 145. The use of user credentials 830 can add an additional layer of protection while transmitting integrity report 170. To reiterate, if user credentials 830 include certificate 850, private-key 845 corresponding with certificate 850 can be used to digitally sign integrity report 170. A person with skill in the art will recognize that digest evaluator plug-in 855 can be a standard software component of an operating system. But it is also possible for digest evaluator plug-in 855 to be a proprietary software component.

In another embodiment, if digest collector 815 has access to public key 860 of certificate 865 of authenticator entity 145, then digest collector 815 can encrypt integrity report 170 (of FIG. 1) using public key 860. This can provide additional confidentiality while transmitting integrity report 170 to digest evaluator plug-in 855 of authenticator entity 145. In yet another embodiment, if user credentials 830 and authenticator entity 145 share a private key, digest collector 815 can encrypt integrity report 170 using the shared private key.

In yet another embodiment, dongle 805 can establish secure tunnels (e.g., tunnels 870 and 875) for transmitting integrity report 170 (of FIG. 1) to authenticator entity 145. Secure inner tunnel 870 and secure outer tunnel 875 allow for end-to-end secure channels, from dongle 805 to authenticator entity 145, to be created irrespective of the underlying physical communications medium (e.g., IEEE 802.3 Ethernet, IEEE 802.11 WiFi, or any other possibilities). Secure outer tunnel 875 can be established between client platform 110 and authenticator entity 145, preferably coupling integrity agent 880 to integrity server/broker 885. Integrity agent 880 and integrity server/broker 885 can be standard trusted network connection (TNC) end-points, which use separate public/private encryption keys, and enable the transfer of IP packets in a secure and reliable manner.

Communications between client platform 110 and authenticator entity 145 can be aided by network access requester 890 on the client side and network access authority 895 on the server side, both of which provide a physical packet-level medium—such as IEEE 802.3 (Ethernet) or wireless/radio such as IEEE 802.11—over which communications can occur. Secure outer tunnel 875 can use standard protocols such as: Extensible Authentication Protocol (EAP), Radius, and Transport Layer Security (TLS). A person skilled in the art will recognize that other protocols can be used, including non-standard protocols. After secure outer tunnel 875 is established, secure inner tunnel 870 can be established between dongle 805 and authenticator entity 145, preferably coupling digest collector 815 to digest evaluator plug-in 855. Secure inner tunnel 870 can be established between dongle 805 and client platform 110 or authenticator entity 145, or between any software components on any machine, so that there is no need to entrust security to other components, even with the potential existence of secure outer tunnel 875. Establishment of secure inner tunnel 870 is described more fully with reference to FIG. 9 below.

Figure 9:
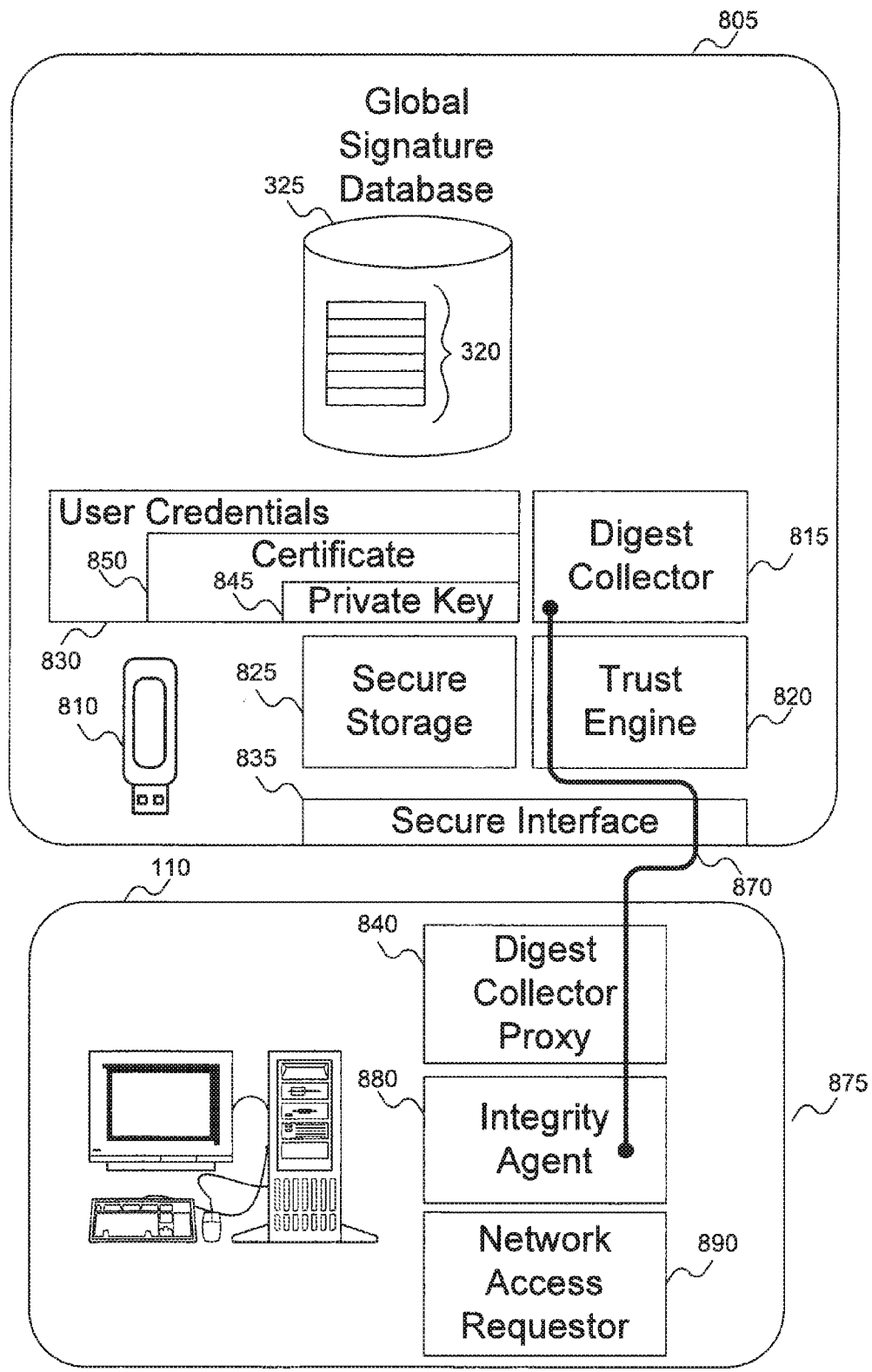
FIG. 9 shows the system of FIG. 8 including global signature database within the portable digest-collector dongle, but without the authenticator entity.

FIG. 9 shows the system of FIG. 8 including GSDB 325 within portable digest-collector dongle 805. In this embodiment, dongle 805 can determine the integrity of client platform 110 without reference to authenticator entity 145. Dongle 805 can be attached to client platform 110 even if the client is not attached to another machine or network, and can perform a self-contained platform integrity verification. All, or a subset of, GSDB 325 information can be stored in either secure storage 825 or a non-secure storage (not shown). Tunnel 870 operates in substantially the same manner as secure inner tunnel 870 discussed in FIG. 8, with the notable differences that it does not pass through an outer tunnel and only connects dongle 805 with client platform 110 (as opposed to authenticator entity 145). Thus, with integrity/trust records 320 of GSDB 325 accessible locally to dongle 805, the platform integrity verification process, substantially as described in other embodiments, can be loaded and launched in a manner that is self-contained. In other words, client platform 110 is not required to be connected to a network—or any other machine—for the verification to occur. This can be especially convenient and efficient for an IT administrator who would like to verify multiple machines which are not yet connected to any network.

Figure 10:
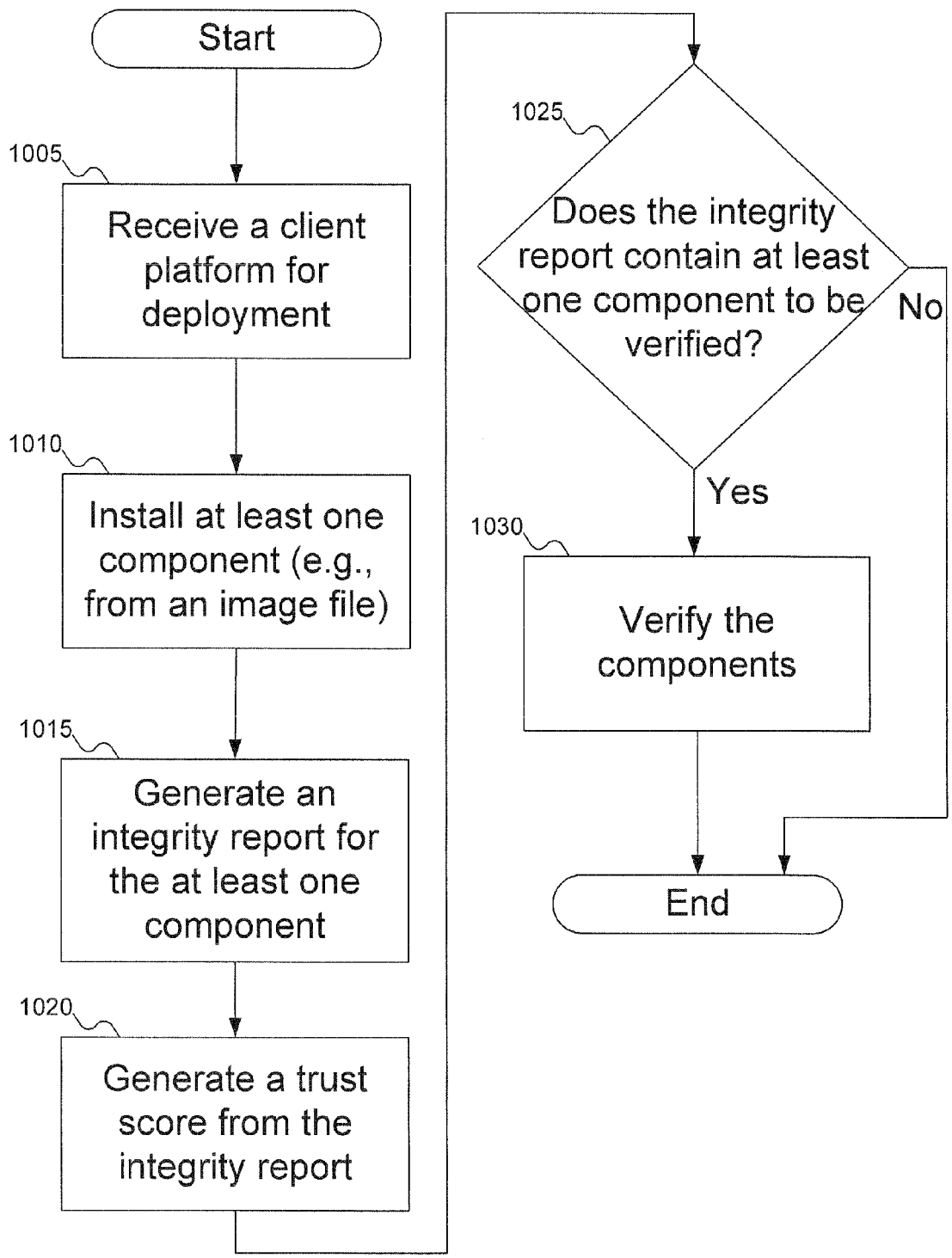
FIG. 10 shows a flowchart of the procedure used to verify the integrity of components of a client platform of FIG. 1.

FIG. 10 shows a flowchart of a procedure used to verify the integrity of components 160 on client platform 10 (shown in FIG. 1) during the process of deploying client platform 110. For example, an IT administrator—or any person with appropriate authority—might want to verify the components and configuration of client platforms 110 in the context of provisioning a new platform within an enterprise domain. At step 1005, the IT administrator receives client platform 110 for deployment. This can include obtaining client platform 110 (e.g., PC clients, servers, routers, switches, PDAs, wireless phones) from the supplier, manufacturer, original equipment manufacturer (OEM), or some other source.

At step 1010, the IT administrator can install at least one component from image file 155 onto client platform 110. A person skilled in the art will recognize that components can also be installed without the use of image file 155; for example, an IT administrator can install components using tools provided by manufacturers of the components, or other proprietary configuration management tools. At step 1015, after software components 160 have been installed on client platform 110, potentially from image file 155, integrity report generator 165 on client platform 110 generates integrity report 170 (of FIG. 1). At step 1020, trust report 220 including overall integrity/trust score 225 (of FIG. 2) can be generated. At step 1025, a check is made whether integrity report 170 has at least one component 160 to be verified. Finally, at step 1030, where there is at least one component 160 to be verified, a verification of components 160 takes place as discussed above. This can occur by sending look-up requests to GSDB 325 of integrity authority 140 (of FIG. 3) corresponding to components 160—both software and hardware—of client platform 110, as shown in FIG. 11.

Figure 11:
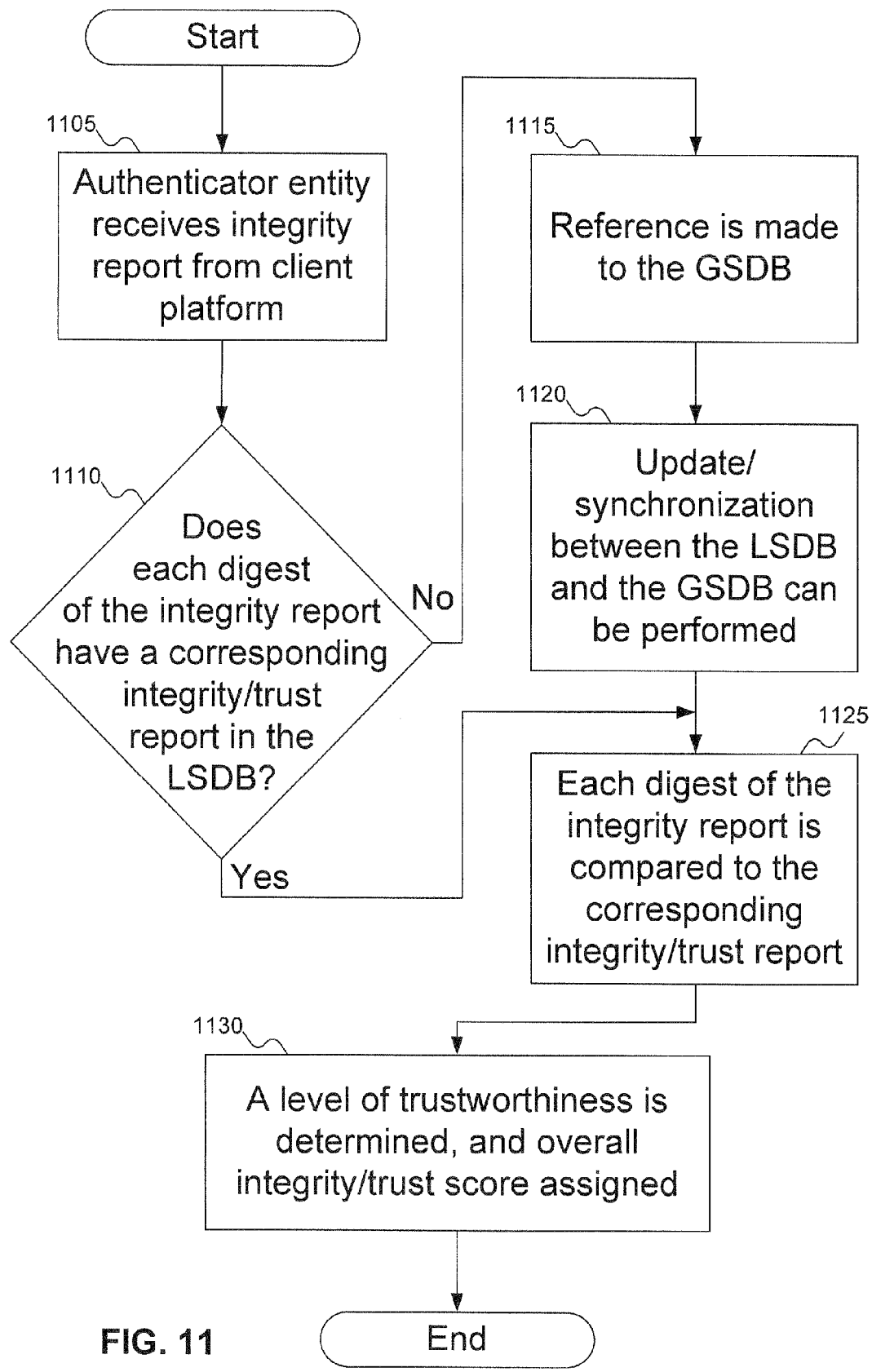
FIG. 11 shows a flowchart of the procedure used to send look-up requests to the signature databases of FIG. 7.

FIG. 11 shows a flowchart of the procedure used to send look-up requests to the signature databases of FIG. 7. At step 1105, authenticator entity 145 (of FIG. 1) can receive integrity report 170 (of FIG. 1) from client platform 110 (of FIG. 9). At step 1110, a check is made whether each of the digests of integrity report 170 has a corresponding integrity/trust record 725 in LSDB 720. If the corresponding integrity/trust record is not found, then at step 1115, reference can be made to GSDB 325 (of FIGS. 3 and 7). Optionally, at step 1120, an update/synchronization between LSDB 720 with GSDB 325 can be performed. Other embodiments of the procedures to update/synchronize are described above, particularly in the context of FIG. 7. Irrespective of whether the corresponding integrity/trust record 725 is found in LSDB 720 or GSDB 325, at step 1125, the corresponding integrity/trust record 725 can be compared with each digest representing component 160 (of FIG. 1) of integrity report 170 (of FIG. 1). At step 1130, a level of trustworthiness for client platform 10 is determined by assigning overall integrity/trust score 225 (of FIG. 2).

Figure 12:
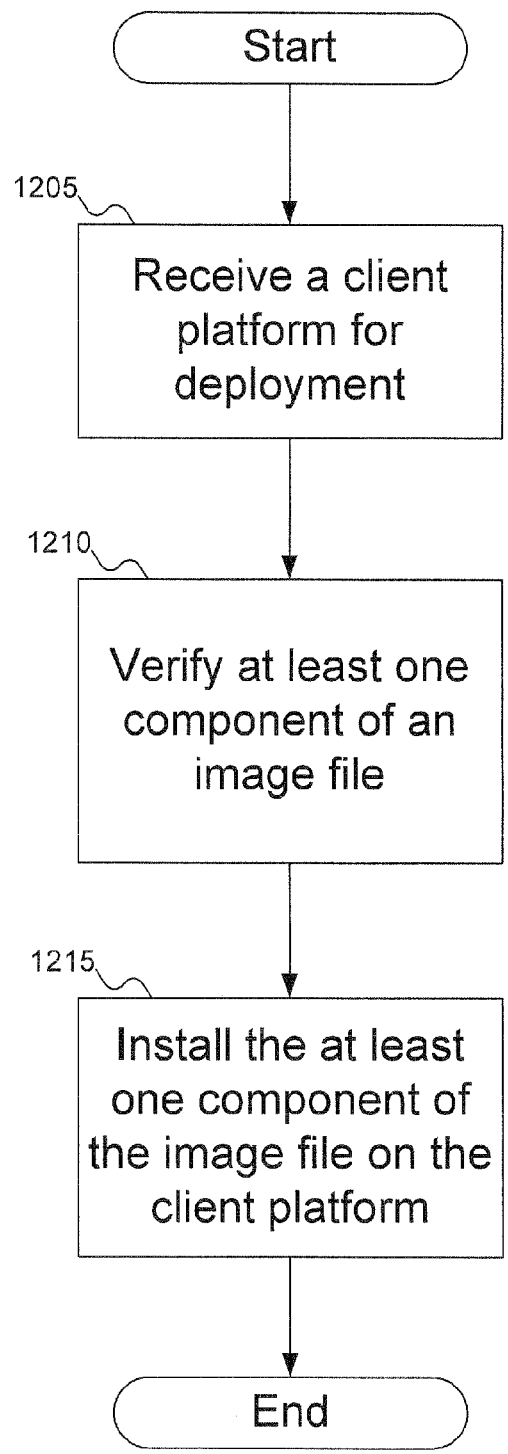
FIG. 12 shows a flowchart of the procedure used to verify the integrity of components of an image file prior to installing the image file.

FIG. 12 shows a flowchart of another procedure used to verify the integrity of components of image file 155 (of FIG. 1) prior to installing the image file during the process of being deployed for initial use. First, client platform 110 (of FIG. 1) can be received for provisioning and deployment at step 1205. At step 1210, the IT administrator, or any person with appropriate authority, can decide to verify at least one component of image file 155 (of FIG. 1), prior to installing image file 155 on client platform 110. The difference between this approach and the process described with respect to FIG. 10 is a difference in timing. The IT administrator can decide to verify components subsequent to the installation of image file 155 as described with respect to FIG. 10, or prior to installation (at step 1215) of image file 155 as described with respect to FIG. 12.

Figure 13:
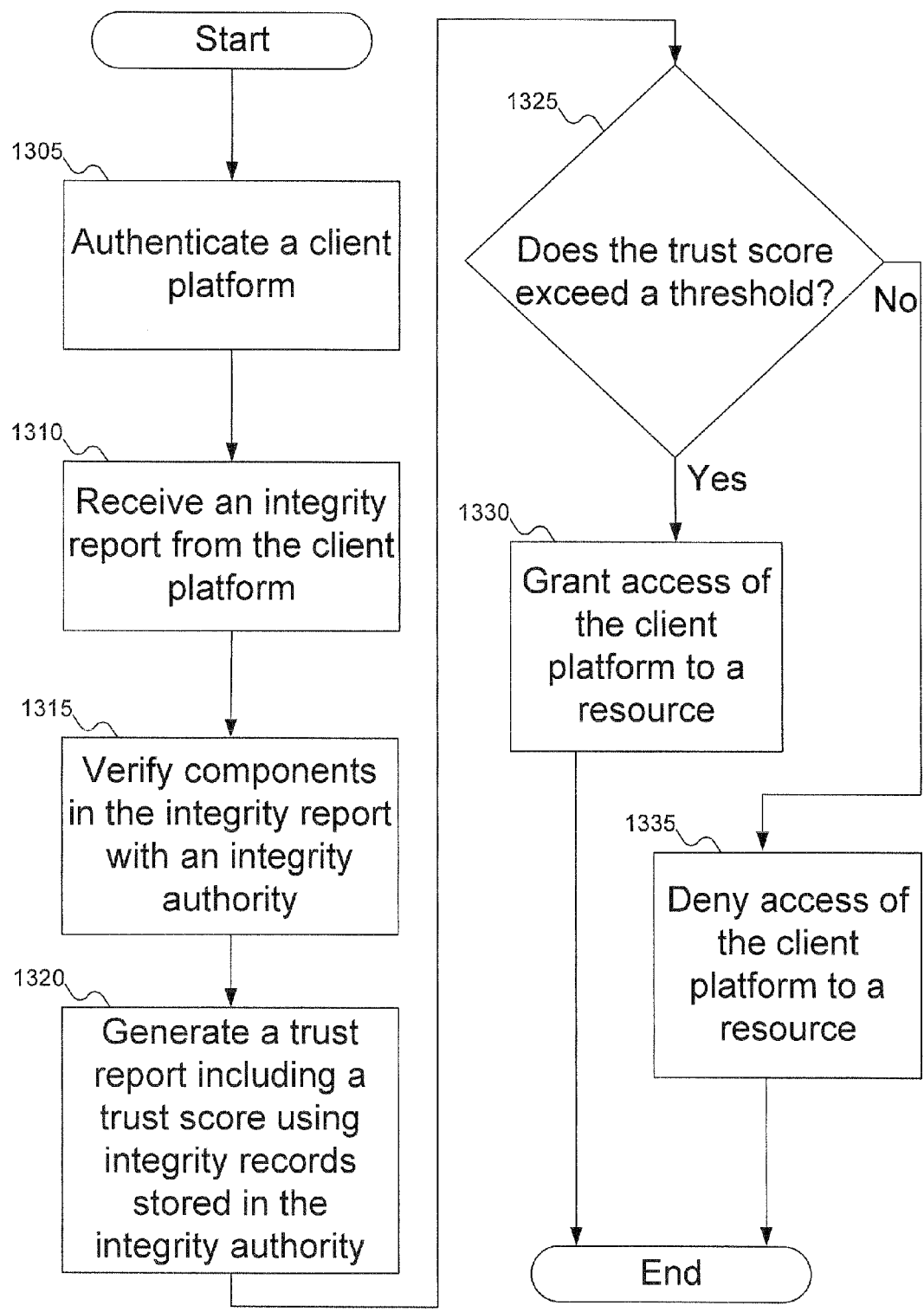
FIG. 13 shows a flowchart of the procedure used to verify the integrity of components of a client platform from the perspective of the authenticator entity of FIG. 2.

FIG. 13 shows a flowchart of the procedure used to verify the integrity of components 160 on client platform 110 from the perspective of authenticator entity 145 of FIG. 1. At step 1305, client platform 110 is authenticated. At step 1310, integrity report 170 is received from client platform 110. At step 1315, components 160 in integrity report 170 are verified with integrity authority 140. As discussed above, this verification can be accomplished using verification server 205. At step 1320, trust report 220 including overall integrity/trust score 225 (of FIG. 2) is generated using integrity/trust records 320 in integrity authority GSDB 325 (of FIG. 3). A check can be made at step 1325 to investigate whether overall integrity/trust score 225 exceeds a predetermined threshold.

If overall integrity/trust score 225 does exceed the predetermined threshold, then client platform 110 can be granted access to resource 150 on network 135 (of FIG. 1). If overall integrity/trust score 225 does not exceed the predetermined threshold, then client platform 110 can be denied access to resource 150 on network 135. Alternatively, client platform 110 can be informed that a remediation is required. For example, if components 160 of client platform 110 have "drifted" such that client platform 110 can no longer be trusted as a whole, the required remediation can militate that client platform 110 be re-imaged using image file 155, or otherwise wiped clean. Alternatively, remediation might involve reinstalling or removing the component that has "drifted" before access to resource 150 is granted. Or client platform 110 might be granted access to resource 150, but perhaps at a reduced level of access until client platform 110 addresses the "drift". A person skilled in the art will recognize other possible approaches to handling component "drift".

Figure 14:
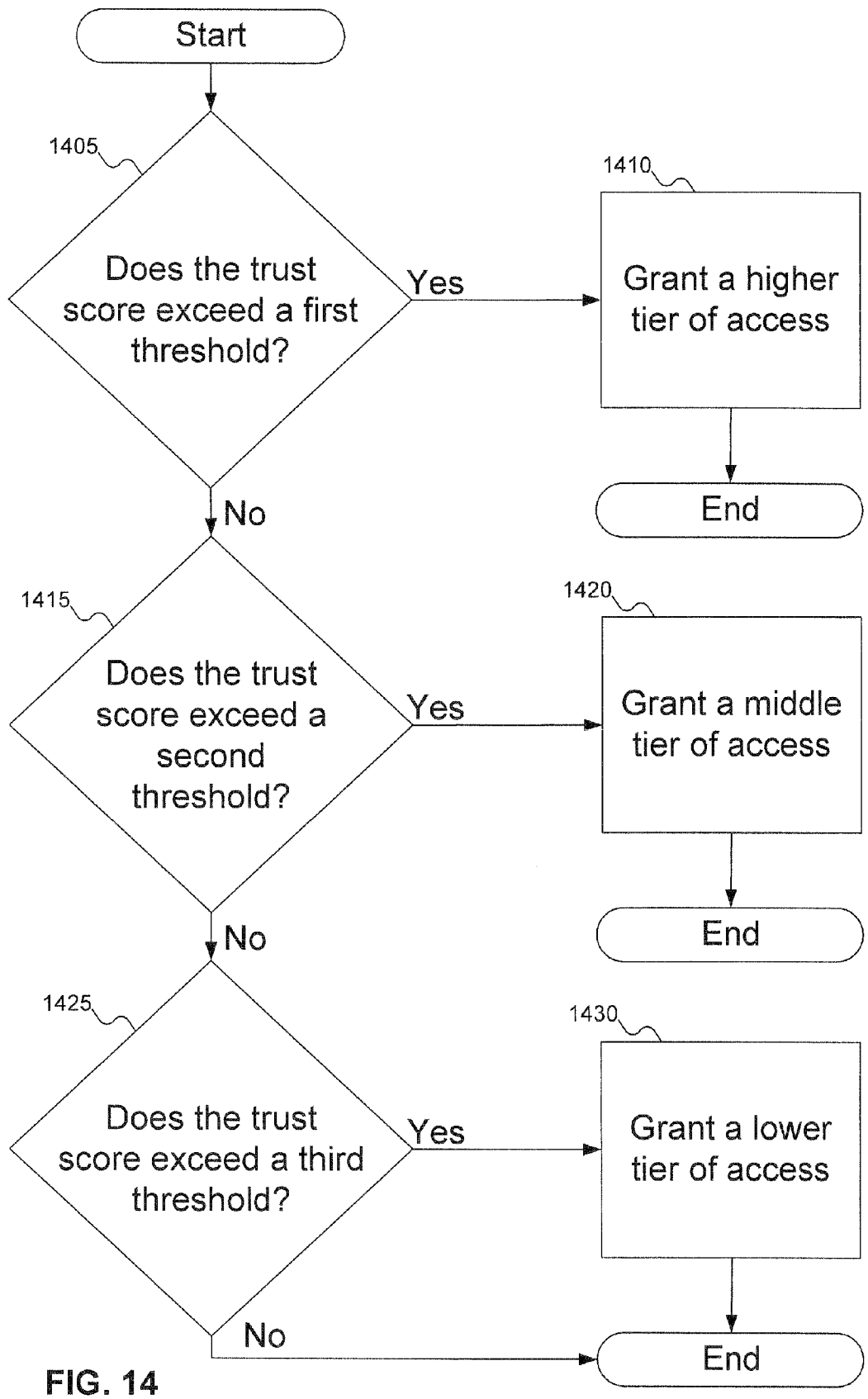
FIG. 14 shows a flowchart of the procedure used to grant multiple tiers of access according to first, second, and third thresholds.

FIG. 14 shows a flowchart of the procedure used to grant client platform 110 (of FIG. 1) multiple tiers of access according to first, second, and third thresholds. Although FIG. 14 suggests that three tiers of access are used, a person skilled in the art will recognize that any number of thresholds and tiers can be used. At step 1405, a check is made whether overall integrity/trust score 225 (of FIG. 2) exceeds a first threshold. If the first threshold is exceeded, a higher tier of access can be granted (at step 1410) to client platform 110. For example, in the bank scenario previously mentioned above, this could mean the ability to perform money wire transfers to external accounts, and other tasks, such as those mentioned with respect to the second and third thresholds (discussed next). At step 1415, a second check is made whether overall integrity/trust score 225 exceeds a second threshold. If the second threshold is exceeded, a middle tier of access can be granted (at step 1420). For example, this could mean the ability to view and transfer funds between internal accounts, but the inability to perform money wire transfers to external accounts. At step 1425, a third check is made whether overall integrity/trust score 225 exceeds a third threshold. If the third threshold is exceeded, a lower tier of access can be granted (at step 1430). For example, this could mean the ability to view account balances, but the inability to transfer funds between internal and external accounts. Although FIG. 14 suggests that a client platform granted a higher tier of access enjoys the capabilities offered to a client platform granted a lower tier of access—and this situation frequently can be the case—a person skilled in the art will recognize that the tiers of access might not be nested. That is, different tiers might provide different levels of access: given two different tiers of access, it might be the case that neither tier is a subset of the other tier. A person skilled in the art will also recognize that granting tiered access based on overall integrity/trust score 225 can apply to other scenarios—outside of the banking example discussed above—such as: tiered access to corporate networks, file sharing networks, online databases, among other possibilities.

Figure 15:
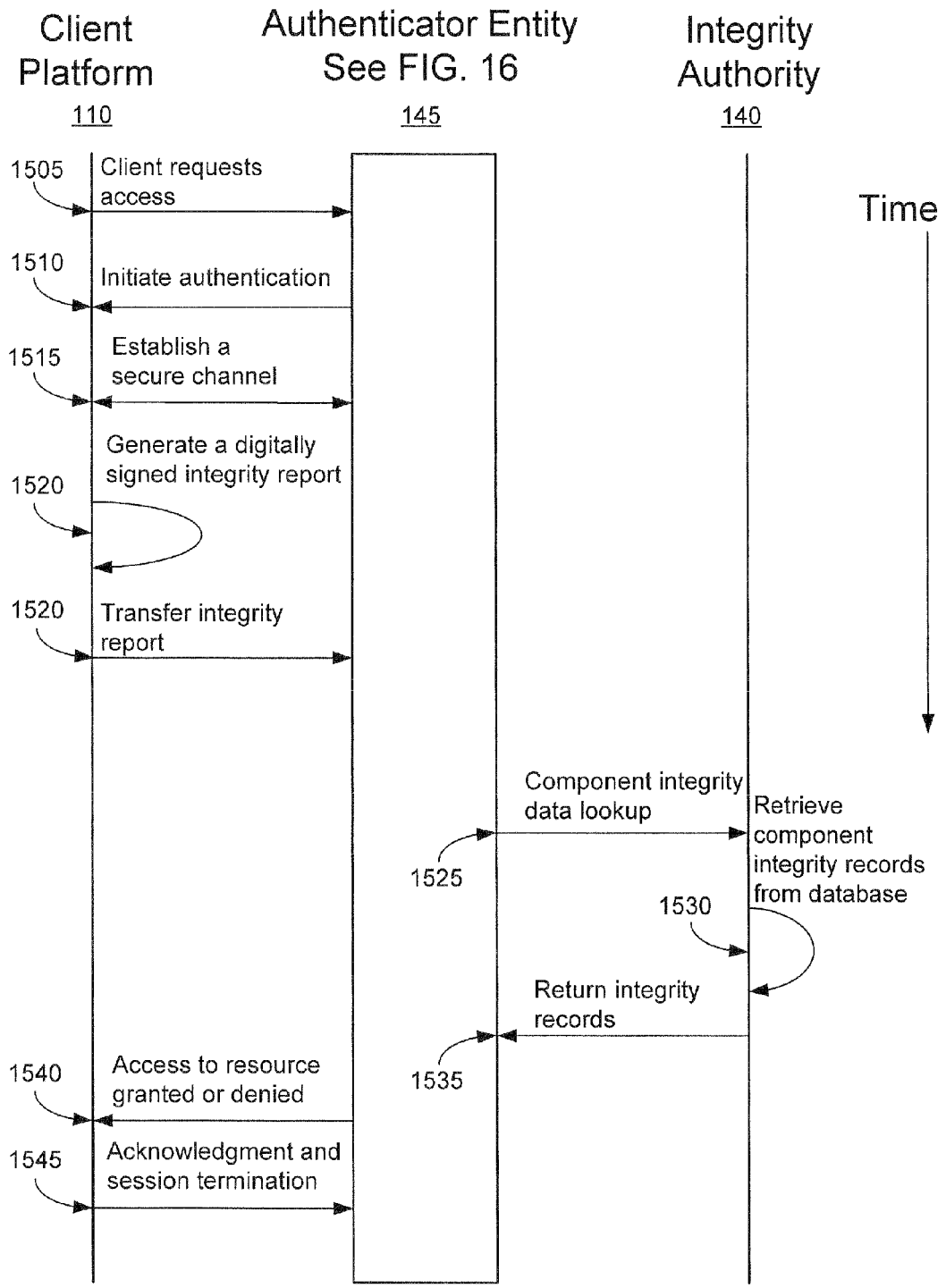
FIG. 15 and FIG. 16 show an operation flow of the procedure used to verify the integrity of components of a client platform of FIG. 1.
Figure 16:
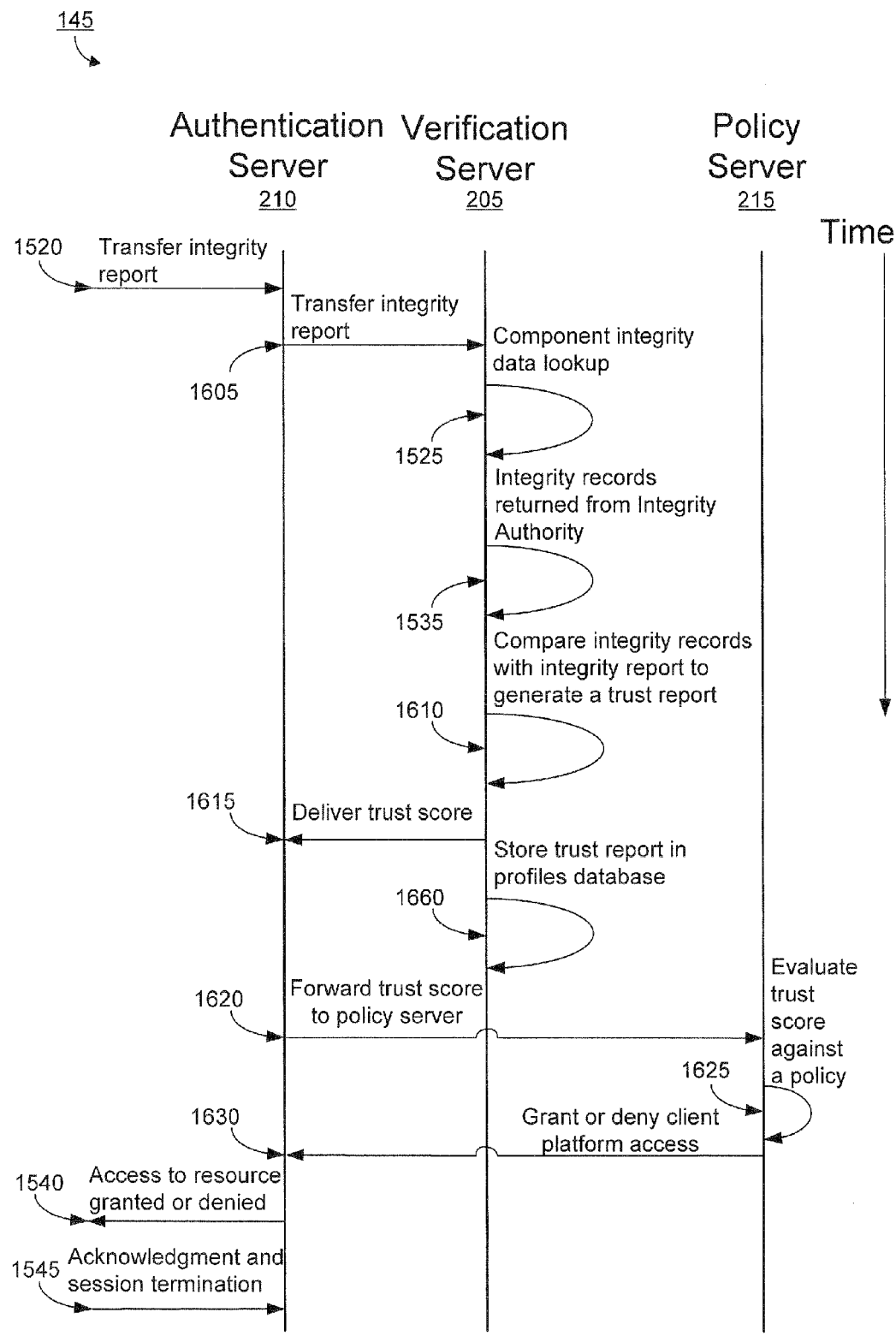

FIGS. 15 and 16 show an operation flow of a procedure used to verify the integrity of components 160 of client platform 110 (of FIG. 1). At step 1505, client platform 110 initiates a handshake with authentication server 210 of authenticator entity 145 of FIG. 2 by requesting access to resource 150. At step 1510, authentication server 210 responds to the request from client platform 110 by initiating the platform integrity verification of client platform 110. At step 1515, a secure channel can optionally be established between client platform 110 and authentication server 210. This can be accomplished using existing frameworks (e.g., 802.1X/EAP) with standard protocols (e.g., SSL, IKE) using appropriate credentials (e.g., SSL certificates). In one embodiment, both client platform 110 and authentication server 210 possess a Trusted Platform Module (TPM) chip and both have TPM certificates (or EK-certificates, AIK-certificates, SKAE-certificates, or other similar certificates). These certificates can be used to establish the secure channel. In another embodiment, one of the machines can possess a TPM chip where the other does not. It is still possible to establish a secure channel between client platform 110 and authentication server 210 by taking advantage of commonalities between the different protocols.

Step 1520 is shown in both FIGS. 15 and 16 and represents the same step of transferring integrity report 170 to authentication server 210 (of FIG. 2). At step 1605 of FIG. 16, integrity report 170 is transferred to verification server 205; an evaluation of client platform 110 using integrity report 170 obtained from client platform 110 (of FIG. 1) occurs. In one embodiment, an interrogative dialog occurs between verification server 205 and client platform 110 that is single-rounded. In another embodiment, the interrogative dialog is multi-rounded. During the interrogative dialog, authentication server 210 acts as an intermediary on behalf of verification server 205 (of FIG. 2). Authentication server 210 can provide a messaging capability between client platform 110 and authentication server 210.

Step 1525 is shown in both FIGS. 15 and 16 and represents the same step of performing look-up operations to GSDB 325 (or LSDB 720) of integrity authority 140 (of FIGS. 3 and 7) for each component 160 of client platform 110 (of FIG. 1). The look-up operations can be sequential on a per-component basis (e.g., using multi-round messages), or can be a single message containing multiple look-up operations.

Step 1530, shown in FIG. 15, explains the operation of retrieving component integrity/trust records 320 from GSDB 325 (of FIG. 3). If the sought-after integrity/trust records 320 are found, integrity authority 140 returns relevant integrity/trust records 320 to verification server 205 at step 1535, shown in both FIGS. 15 and 16.

At step 1610 in FIG. 16, comparator 525 (of FIG. 5) compares the digests in integrity report 170 (of FIG. 2) with integrity/trust records 320 (of FIG. 3) returned from GSDB 325. By comparing the digests in integrity report 170 with integrity/trust records 320 returned from GSDB 325, verification server 205 can determine a level of trustworthiness for client platform 110 (of FIG. 2). The level of trustworthiness can be embodied in trust report 220 including overall integrity/trust score 225 (of FIG. 2). At step 1615, verification server 205 delivers trust report 220 including overall integrity/trust score 225 to authentication server 210 (of FIG. 2). Subsequently, verification server 205 stores trust report 220, together with other information such as date/time of the evaluation, in profiles database 235 (of FIG. 2). At step 1620, authentication server 210, after having received overall integrity/trust score 225, forwards it to policy server 215 (of FIG. 2). At step 1625, policy server 215 compares overall integrity/trust score 225 with a predetermined policy or threshold and makes a decision whether to grant or deny client platform 110 access to resource 150 (of FIG. 2). If client platform 110 does not have a sufficiently high integrity/trust score, client platform 110 can be informed that a remediation is required, after which access could be granted. At step 1630, policy server 215 forwards the grant/deny result to authentication server 210, which then forwards the result to client platform 110 shown at step 1540, shown in both FIGS. 15 and 16. Finally, at step 1545 (also shown in both FIGS. 15 and 16), client platform 110 acknowledges the receipt of the grant/deny result and terminates the platform authentication session. Alternatively, authentication server 210 can implement a session time-out mechanism to close the authentication session if client platform 110 fails to terminate the session after a period of time.

The following discussion is intended to provide a brief, general description of a suitable machine in which certain aspects of the invention can be implemented. Typically, the machine includes a system bus to which is attached processors, memory, e.g., random access memory (RAM), read-only memory (ROM), or other state preserving medium, storage devices, a video interface, and input/output interface ports. The machine can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine can include embedded controllers, such as programmable or non-programmable logic devices or arrays, Application Specific Integrated Circuits, embedded computers, smart cards, and the like. The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations, As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system for verifying the integrity of components within a trusted computing environment, comprising:
   a client platform capable of being connected to a network, including an integrity report generator to generate an integrity report, wherein said integrity report includes a hash of at least one component of the client platform;
   an integrity authority separate and remote from the client platform, and capable of being connected to the network, the integrity authority including a global signature database to store a first plurality of integrity records, wherein each of the first plurality of integrity records includes a trustworthy hash;
   an authenticator entity including a local signature database to store a second plurality of integrity records, wherein each of the second plurality of integrity records includes a trustworthy hash,
   wherein the authenticator entity is configured to compare said hash of at least one component of said integrity report with said trustworthy hash of each of the second plurality of integrity records;
   an authentication server separate from the client platform, and capable of being connected to the network to remotely authenticate the client platform;

a verification server separate from the client platform, and capable of being connected to the network to receive said integrity report from the client platform, to compare said hash of at least one component of said integrity report with said trustworthy hash of each of the first plurality of integrity records from the integrity authority if said hash of at least one component of said integrity report is not found in said second plurality of integrity records, and to provide a trust report to the authentication server, wherein said trust report includes an integrity/trust score that is determined based at least in part on the comparison of said hash of at least one component with said trustworthy hash of each of the first plurality of integrity records and the second plurality of integrity records;

a resource available on the network; and a policy server separate and remote from the client platform, and capable of being connected to the network to grant or deny access to the resource by the client platform according to the integrity/trust score, wherein the authenticator entity includes the verification server, the authentication server, and the policy server and the authenticator entity is configured to periodically synchronize said local signature database with said first plurality of integrity records of said global signature database.

2. A system according to claim 1, wherein the verification server includes a profiles database to store information regarding the client platform.

3. A system according to claim 1, wherein said integrity report is digitally signed.

4. A system according to claim 1, wherein:
said local signature database comprises a subset of said first plurality of integrity records of said global signature database; and
the verification server includes a comparator to compare said integrity report with said second plurality of integrity records or said first plurality of integrity records to generate said trust report.

5. A system according to claim 1, wherein said trust report further includes:
a client platform identity identifying the client platform; and
a verification server identity identifying the verification server.

6. A system according to claim 1, wherein the integrity authority is operative to harvest raw information of components, verify the correctness of said raw information, refine said raw information into refined information, and store said refined information.

7. A system according to claim 1, wherein:
each of said first plurality of integrity records of said global signature database includes at least one hash of a component;
each of said second plurality of integrity records of said local signature database includes at least one hash of a component;
the local signature database is configured to periodically receive updates from the global signature database according to a corporate policy.

8. A system according to claim 1, wherein:
each of said first plurality of integrity records of said global signature database includes information identifying the integrity authority; and
each of said second plurality of integrity records of said local signature database includes information identifying the integrity authority.

9. A system according to claim 1, wherein the client platform is drawn from a set consisting of a mobile phone, personal digital assistant, network element, router, switch, server, and personal computer.

10. A system according to claim 3, wherein said integrity report is digitally signed using a Trusted Platform Module (TPM) certificate.

11. A system according to claim 5, wherein said trust report further includes a reference to a TPM certificate of the client platform.

12. A system according to claim 11, wherein said integrity/trust score is determined in part by said TPM certificate.

13. A computer-implemented method for verifying the integrity of components, comprising:
verifying at least one component of an image file, wherein verifying includes:
generating an integrity report for at least one component of a client platform, the integrity report including a digest for the at least one component of the client platform;
checking whether each digest in the integrity report has a corresponding integrity record in a local signature database;
if one or more digests does not have a corresponding integrity record in the local signature database, checking whether the one or more digests has a corresponding integrity record in a global signature database associated with an integrity authority that is separate and remote from the client platform, and verifying the digests in the integrity report with the integrity authority against the integrity records in the global signature database; and
generating a trust report by a verification server including an integrity/trust score using the integrity report, the integrity/trust score being determined in part by a certificate used to sign the integrity report, wherein the verification server is separate from the client platform and remotely generates the trust report including the integrity/trust score;
deploying the client platform after verifying the at least one component of the image file, wherein deploying includes:
installing the at least one component of the image file on the client platform after verifying the image file; and
synchronizing the integrity records in the local signature database with the integrity records in the global signature database.

14. A computer-implemented method according to claim 13, further comprising verifying at least one component of the client platform, wherein verifying includes generating the integrity report and the trust report.

15. A computer-implemented method according to claim 13, further comprising:
deploying the client platform, wherein deploying includes:
installing the at least one component of the image file on the client platform prior to verifying the image file.

16. A computer-implemented method according to claim 14, further comprising:
authenticating the client platform;
receiving the integrity report from the client platform; and
verifying components in the integrity report with an integrity authority.

17. A computer-implemented method according to claim 16, further comprising:
generating the trust report including the integrity/trust score using integrity records stored in the integrity authority; and granting access of the client platform to a resource if the integrity/trust score exceeds a threshold.

18. A computer-implemented method according to claim 16, further comprising:
generating the trust report including the integrity/trust score using integrity records stored in the integrity authority; and
denying access of the client platform to a resource if the integrity/trust score does not exceed a threshold.

19. A system for verifying the integrity of components within a trusted computing environment, comprising:
an integrity authority capable of being connected to a network including a global signature database to store a first plurality of integrity records, wherein each of the first plurality of integrity records includes a trustworthy hash;
an authenticator entity including a local signature database to store a second plurality of integrity records, wherein each of the second plurality of integrity records includes a trustworthy hash,
wherein the authenticator entity is configured to compare said hash of at least one component of said integrity report with said trustworthy hash of each of the second plurality of integrity records;
an authentication server capable of being connected to the network to authenticate a client platform, wherein the integrity authority and the authentication server are separate and remote from the client platform;
a verification server separate from the client platform, and capable of being connected to the network to receive an integrity report from said client platform, to compare a hash of said integrity report with said trustworthy hash of each of the first plurality of integrity records from the integrity authority if said hash of said integrity report is not found in said second plurality of integrity records, and to provide a trust report to the authentication server, wherein the trust report includes an integrity/trust score that is determined based on the comparison of said hash of said integrity report with said trustworthy hash of each of the first plurality of integrity records and the second plurality of integrity records;
a resource available on the network;
a policy server separate from the client platform, and capable of being connected to the network to control access to the resource by said client platform according to the integrity/trust score,
wherein said integrity/trust score is used by the policy server to decide whether to grant or deny access to the resource by said client platform, and
wherein the authenticator entity includes the verification server, the authentication server, and the policy server and the authenticator entity is configured to periodically synchronize said local signature database with said first plurality of integrity records of said global signature database.

20. An article comprising a non-transitory machine-accessible and readable storage medium having associated data that, when accessed, results in a machine:
generating an integrity report for at least one component;
generating a trust report including an integrity/trust score using the integrity report, the integrity/trust score being determined in part by a Trusted Platform Module (TPM) certificate used to sign the integrity report;
authenticating a client platform;
receiving the integrity report including a plurality of digests from the client platform;
checking whether each of the plurality of digests has a corresponding integrity record in a local signature database;
if one or more of the digests does not have a corresponding integrity record in the local signature database, checking whether said one or more digests has a corresponding integrity record in a global signature database associated with an integrity authority that is separate and remote from the client platform, and verifying the plurality of digests in the integrity report with the remote integrity authority;
generating a trust report including an integrity/trust score using integrity records stored in the local signature database or the global signature database of the remote integrity authority;
granting access of the client platform to a resource if the integrity/trust score exceeds a threshold;
denying access of the client platform to the resource if the integrity/trust score does not exceed the threshold; and
synchronizing the integrity records in the local signature database with the integrity records in the global signature database.

21. An article according to claim 20, further comprising verifying at least one component of the client platform, wherein verifying includes generating the integrity report and the trust report.

22. An article according to claim 20, further comprising:
generating the trust report including the integrity/trust score using integrity records stored in the integrity authority.

23. An article according to claim 20, further comprising verifying at least one component of an image file, wherein verifying includes generating the integrity report and the trust report.

24. An article according to claim 23, further comprising:
deploying a client platform, wherein deploying includes:
installing the at least one component of the image file on the client platform prior to verifying the image file.

25. An article according to claim 23, further comprising:
deploying a client platform, wherein deploying includes:
installing the at least one component of the image file on the client platform after verifying the image file.

* * * * *